(12) United States Patent
Whang et al.

(10) Patent No.: US 11,347,903 B2
(45) Date of Patent: May 31, 2022

(54) PASSENGER SERVICE UNIT PLACEMENT LAYOUT SYSTEM FOR AIRCRAFT

(71) Applicant: The Boeing Company, Chicago, IL (US)

(72) Inventors: Chongman Whang, Lynnwood, WA (US); Rodney Victor Thill, Marysville, WA (US)

(73) Assignee: The Boeing Company, Chicago, IL (US)

( * ) Notice: Subject to any disclaimer, the term of this patent is extended or adjusted under 35 U.S.C. 154(b) by 293 days.

(21) Appl. No.: 16/717,917

(22) Filed: Dec. 17, 2019

(65) Prior Publication Data
US 2021/0182447 A1   Jun. 17, 2021

(51) Int. Cl.
*G06F 30/15* (2020.01)
*G06Q 10/08* (2012.01)
*G06T 17/10* (2006.01)
*G06F 3/04815* (2022.01)

(52) U.S. Cl.
CPC .......... *G06F 30/15* (2020.01); *G06F 3/04815* (2013.01); *G06Q 10/0875* (2013.01); *G06T 17/10* (2013.01)

(58) Field of Classification Search
CPC .. G06F 2111/20; G06F 3/04815; G06F 30/12; G06F 30/15; G06Q 10/0875; G06T 2200/24; G06T 17/10; H01R 31/06
See application file for complete search history.

(56) References Cited

U.S. PATENT DOCUMENTS

| | | | | |
|---|---|---|---|---|
| 7,529,649 B2* | 5/2009 | Lee | ......................... | G06F 30/15 703/1 |
| 8,060,345 B2* | 11/2011 | Lee | ......................... | G06F 30/15 703/1 |
| 8,849,619 B2* | 9/2014 | Hk | ......................... | G06F 30/394 703/1 |
| 9,058,464 B2* | 6/2015 | Song | ........................ | G06F 30/15 |
| 10,181,005 B2* | 1/2019 | Whang | .................... | G06F 30/15 |
| 2005/0209830 A1* | 9/2005 | Lee | .......................... | G06F 30/15 703/1 |
| 2017/0103159 A1* | 4/2017 | Whang | ................... | G06F 30/15 |

(Continued)

FOREIGN PATENT DOCUMENTS

WO    WO-2015197873 A1 * 12/2015 .......... G06Q 10/043

*Primary Examiner* — Kibrom K Gebresilassie
(74) *Attorney, Agent, or Firm* — Yee & Associates, P.C.

(57) ABSTRACT

A method, apparatus, and system for creating a passenger service unit layout for a production aircraft. Passenger seat configuration information describing seat locations and overhead bin configuration information describing overhead service unit length ranges for the production aircraft is identified. Lengths available for placing passenger service units in the production aircraft is determined using the passenger seat configuration information and the overhead bin configuration information for the production aircraft. The passenger service units are placed in the lengths using a set of priority rules for the passenger service units to determine placements of the passenger service units, wherein the set of priority rules specify a priority in placing different types of the passenger service units. A model of a three-dimensional passenger service unit layout with determined placements for the passenger service units for the production aircraft is generated.

31 Claims, 20 Drawing Sheets

(56) References Cited

U.S. PATENT DOCUMENTS

2017/0137129 A1* 5/2017 Hessling-Von Heimendahl ......... B64D 47/00
2017/0283086 A1* 10/2017 Garing ............... B64D 45/0051
2019/0177004 A1* 6/2019 Skelly ................ H04N 5/23216

* cited by examiner

| TRUE STA | BODY STA (REF) VIEW 1E10 | WL | PANEL TYPE | PART NUMBER |
|---|---|---|---|---|
| 414.81 | 414.81 | 266.11 | INFO SIGN | 7X01IN1P1 |
| 420.79 | 420.79 | 266.11 | SPACER 9 | 7X01SP9 |
| 429.77 | 429.77 | 266.11 | SPACER 9 | 7X01SP9 |
| 438.75 | 438.75 | 266.11 | SPACER 4 | 7X01SP4 |
| 442.74 | 442.74 | 266.11 | SPACER 2 | 7X01SP2 |
| 444.74 | 444.74 | 266.11 | CONSOLIDATED PANEL | 7X01CN5L4E2A1 |
| 462.70 | 462.70 | 266.11 | PAO PANEL | 7X01PA1P2C |
| 466.69 | 466.69 | 266.11 | INFO SIGN | 7X01IN1P1 |
| 472.68 | 472.68 | 266.11 | SPACER 9 | 7X01SP9 |
| 481.66 | 481.66 | 266.11 | SPACER 9 | 7X01SP9 |
| 490.64 | 490.64 | 266.11 | SPACER 9 | 7X01SP9 |
| 499.62 | 499.62 | 266.11 | SPACER 4 | 7X01SP4 |
| 503.61 | 503.61 | 266.11 | SPACER 3 | 7X01SP3 |
| 506.60 | 506.60 | 266.11 | SPACER 9 | 7X01SP9 |
| 515.58 | 515.58 | 266.11 | SPACER 9 | 7X01SP9 |
| 524.56 | 524.56 | 266.11 | SPACER 4 | 7X01SP4 |
| 528.55 | 528.55 | 266.11 | OXYGEN PANEL | 7X01XP5L4E |
| 548.33 | 548.33 | 266.11 | READING LIGHT | 7X01RP5A2X1N1 |
| 554.33 | 554.33 | 266.11 | PAO PANEL | 7X01PA1P2C |
| 558.33 | 558.33 | 266.11 | SPACER 9 | 7X01SP9 |
| 567.33 | 567.33 | 266.11 | SPACER 9 | 7X01SP9 |
| 576.33 | 576.33 | 266.11 | SPACER 4 | 7X01SP4 |
| 580.33 | 580.33 | 266.11 | SPACER 3 | 7X01SP3 |
| 583.33 | 583.33 | 266.11 | CLASS DIVIDER | 7X01CL4A |
| 587.33 | 587.33 | 266.11 | SPACER 3 | 7X01SP3 |
| 591.05 | 591.05 | 266.11 | SPACER 9 | 7X01SP9 |
| 600.05 | 600.05 | 266.11 | SPACER 4 | 7X01SP4 |
| 604.05 | 604.05 | 266.11 | PSM | 7X01PS4 |
| 610.05 | 610.05 | 266.11 | PAO PANEL | 7X01PA1P2C |
| 614.05 | 614.05 | 266.11 | READING LIGHT | 7X01RP5A2X1N1 |
| 620.05 | 620.05 | 266.11 | OXYGEN PANEL | 7X01XP5L4E |
| 632.05 | 632.05 | 266.11 | SPACER 3 | 7X01SP3 |
| 635.05 | 635.05 | 266.11 | INFO SIGN | 7X01IN1P1 |
| 641.05 | 641.05 | 266.11 | INFO SIGN | 7X01IN1P1 |
| 647.05 | 647.05 | 266.11 | SPACER 3 | 7X01SP3 |
| 650.05 | 650.05 | 266.11 | SPACER 2 | 7X01SP2 |

FROM FIG. 8B

| | | | | |
|---|---|---|---|---|
| 652.05 | 652.05 | 266.11 | OXYGEN PANEL | 7X01XP5L4E |
| 664.05 | 655+9.05 | 266.11 | READING LIGHT | 7X01RP5A2X1N1 |
| 670.05 | 655+15.05 | 266.11 | PAO PANEL | 7X01PA1P2C |
| 674.05 | 655+19.05 | 266.11 | SPACER 9 | 7X015P9 |
| 683.05 | 655+28.05 | 266.11 | SPACER 9 | 7X015P9 |
| 692.05 | 655+37.05 | 266.11 | SPACER 9 | 7X015P9 |
| 701.05 | 655+46.05 | 266.11 | SPACER 9 | 7X015P9 |
| 710.05 | 655+55.05 | 266.11 | SPACER 4 | 7X015P4 |
| 714.05 | 655+59.05 | 266.11 | SPACER 3 | 7X015P3 |
| 717.05 | 655+62.05 | 266.11 | PAO PANEL | 7X01PA1P2C |
| 721.05 | 655+66.05 | 266.11 | READING LIGHT | 7X01RP5A2X1N1 |
| 727.05 | 655+72.05 | 266.11 | OXYGEN PANEL | 7X01XP5L4E |
| 739.05 | 655+84.05 | 266.11 | SPACER 4 | 7X015P4 |
| 743.05 | 655+88.05 | 266.11 | INFO SIGN | 7X01IN1F1 |
| 749.05 | 655+94.05 | 266.11 | INFO SIGN | 7X01IN1F1 |
| 755.05 | 655+100.05 | 266.11 | SPACER 4 | 7X015P4 |
| 759.05 | 655+104.05 | 266.11 | OXYGEN PANEL | 7X01XP5L4E |
| 771.05 | 655+116.05 | 266.11 | READING LIGHT | 7X01RP5A2X1N1 |
| 777.05 | 655+122.05 | 266.11 | PAO PANEL | 7X01PA1P2C |
| 781.05 | 655+126.05 | 266.11 | SPACER 9 | 7X015P9 |
| 790.05 | 655+135.05 | 266.11 | SPACER 9 | 7X015P9 |
| 799.05 | 655+144.05 | 266.11 | SPACER 2 | 7X015P2 |
| 802.55 | 655+147.05 | 266.11 | SPACER 9 | 7X015P9 |
| 811.55 | 655+156.05 | 266.11 | SPACER 4 | 7X015P4 |
| 815.55 | 655+160.05 | 266.11 | SPACER 3 | 7X015P3 |
| 818.55 | 655+163.05 | 266.11 | PSM | 7X01PS4 |
| 824.55 | 655+169.05 | 266.11 | PAO PANEL | 7X01PA1P2C |
| 828.55 | 655+173.05 | 266.11 | READING LIGHT | 7X01RP5A2X1N1 |
| 834.55 | 655+179.05 | 266.11 | OXYGEN PANEL | 7X01XP5L4E |
| 846.55 | 655+191.05 | 266.11 | SPACER 3 | 7X015P3 |
| 849.55 | 655+194.05 | 266.11 | INFO SIGN | 7X01IN1F1 |
| 855.55 | 655+200.05 | 266.11 | INFO SIGN | 7X01IN1F1 |
| 861.55 | 655+206.05 | 266.11 | SPACER 4 | 7X015P4 |
| 865.55 | 655+210.05 | 266.11 | OXYGEN PANEL | 7X01XP5L4E |
| 877.55 | 655+222.05 | 266.11 | READING LIGHT | 7X01RP5A2X1N1 |
| 883.55 | 655+228.05 | 266.11 | PAO PANEL | 7X01PA1P2C |
| 887.55 | 655+232.05 | 266.11 | SPACER 9 | 7X015P9 |
| 896.55 | 655+241.05 | 266.11 | SPACER 9 | 7X015P9 |
| 905.55 | 655+250.05 | 266.11 | SPACER 3 | 7X015P3 |

908

| TRUE STA | BODY STA (REF) VIEW 1E10 | WL | PANEL TYPE | PART NUMBER |
|---|---|---|---|---|
| | 910 | | 912 | 914 |
| 1631.55 | 1379.55 | 266.11 | SPACER 2 | 7X01SP2 |
| 1633.55 | 1381.55 | 266.11 | OXYGEN PANEL | 7X01XP5L3N |
| 1646.55 | 1394.55 | 266.11 | READING LIGHT | 7X01RP5A2X1N1 |
| 1652.55 | 1400.55 | 266.11 | PAO PANEL | 7X01PA1P2C |
| 1656.55 | 1404.55 | 266.11 | INFO SIGN | 7X01IN1F1 |
| 1662.55 | 1410.55 | 266.11 | SPACER 4 | 7X01SP4 |
| 1666.55 | 1414.55 | 266.11 | SPACER 2 | 7X01SP2 |
| 1668.55 | 1416.55 | 266.11 | CONSOLIDATED PANEL | 7X01CN5L3N2A1 |
| 1686.55 | 1434.55 | 266.11 | PAO PANEL | 7X01PA1P2C |
| 1690.55 | 1438.55 | 266.11 | SPACER 9 | 7X01SP9 |
| 1699.55 | 1447.55 | 266.11 | SPACER 9 | 7X01SP9 |
| 1708.55 | 1456.55 | 266.11 | SPACER 4 | 7X01SP4 |
| 1749.55 | 1497.55 | 282.61 | INFO SIGN | 7X01IN1F1 |
| 1755.55 | 1503.55 | 282.61 | PAO PANEL | 7X01PA1P2C |
| 1759.55 | 1507.55 | 282.61 | READING LIGHT | 7X01RP5A2X0N1 |
| 1765.55 | 1513.55 | 282.61 | OXYGEN PANEL | 7X01XP5L2N |
| 1777.55 | 1525.55 | 282.61 | SPEAKER | 7X01SK4 |
| 1785.55 | 1533.55 | 282.61 | INFO SIGN | 7X01IN1F1 |
| 1791.55 | 1539.55 | 282.61 | SPACER 9 | 7X01SP9 |
| 1800.55 | 1548.55 | 282.61 | SPACER 3 | 7X01SP3 |
| 1803.55 | 1551.55 | 282.61 | SPACER 2 | 7X01SP2 |

FIG. 9B

| TRU STA | BODY STA (REF) VIEW 1E9 | WL | PANEL TYPE | PART NUMBER | WAYFINDER PART NUMBER 2 | SEAT LETTER INSERT PART NUMBER 2 | NOTES |
|---|---|---|---|---|---|---|---|
| 2417.71 | 1934.71 | 266.11 | INFO SIGN | 7X011N1F1 | | | |
| 2423.70 | 1940.70 | 266.11 | CONSOLIDATED PANEL | 7X01CN5L3N2A1 | | | |
| 2441.66 | 1958.66 | 266.11 | PAO PANEL | 7X01PA1P2C | | | |
| 2445.65 | 1962.65 | 266.11 | SPACER 9 | 7X01SP9 | | | |
| 2454.63 | 1971.63 | 266.11 | SPACER 9 | 7X01SP9 | | | |
| 2463.61 | 1980.61 | 266.11 | SPACER 3 | 7X01SP3 | | | |

FIG. 10B

PASSENGER SERVICE UNIT PLACEMENT LAYOUT SYSTEM FOR AIRCRAFT

BACKGROUND INFORMATION

1. Field

The present disclosure relates generally to aircraft and, in particular, to manufacturing aircraft. Still more particularly, the present disclosure relates to a method, apparatus, and system for creating a passenger service unit layout for a production aircraft.

2. Background

Manufacturing an aircraft is an extremely complex process. Hundreds of thousands of parts may be assembled for an aircraft. The assembly of parts includes passenger service units located in the passenger cabin of an aircraft. The passenger service units can be located above each row of passenger seats in the passenger cabin. These passenger service units can include reading lights, loudspeakers, illuminated signs, call buttons, oxygen systems, personal air outlets, and other suitable types of personal service units.

The selection and placement of passenger service units form a passenger service unit layout. This layout can be a part of the layout of passenger accommodations.

The selection and placement of passenger service units can be more time-consuming and complicated than desired. For example, an aircraft cabin can include a layout of 700 passenger service units. The layout of passenger service units for an aircraft can consume 150 or more hours. Further, as different aircraft interiors change based on customer requirements, additional layouts are created to meet these needs.

Therefore, it would be desirable to nave a method and apparatus that take into account at least some of the issues discussed above, as well as other possible issues. For example, it would be desirable to have a method and apparatus that overcome a technical problem with the amount of time and effort needed to generate passenger service unit layouts for aircraft.

SUMMARY

A passenger service unit layout system for a production aircraft comprising a computer system and a layout manager in the computer system is presented. The layout manager is configured to identify passenger seat configuration information describing seat locations and overhead bin configuration information describing overhead service unit length ranges for the production aircraft. The layout manager is configured to determine lengths available for placing passenger service units in the production aircraft using the passenger seat configuration information and the overhead bin configuration information for the production aircraft. The layout manager is also configured to place the passenger service units in the lengths using a set of priority rules for the passenger service units to determine placements of the passenger service units, wherein the set of priority rules specifies a priority in placing different types of the passenger service units and generate a model of a three-dimensional passenger service unit layout with determined placements for the passenger service units for the production aircraft.

Another embodiment of the present disclosure provides a passenger service unit layout system comprising a computer system and a layout manager in the computer system. The layout manager is configured to identify a set of priority rules that are specific for a production aircraft, wherein the set of priority rules specify a priority in placing different types of passenger service units and are based on government regulations, manufacturer rules, and customer preferences for passenger service units in the production aircraft. The layout manager is configured to identify passenger seat configuration information and overhead bin configuration information for the production aircraft, wherein the passenger seat configuration information describes seat locations for passenger seats in the production aircraft and the overhead bin configuration information describes overhead service unit length ranges in the production aircraft. The layout manager is configured to determine lengths available for placing the passenger service units in the production aircraft using the passenger seat configuration information and the overhead bin configuration information for the production aircraft. The layout manager is configured to place the passenger service units in the lengths in a model using the set of priority rules for the passenger service units. The model is digital data comprising data points in a space and information about the passenger service units placed in the lengths. The layout manager is configured to identify part numbers for the passenger service units and generate a bill of materials using the part numbers identified and passenger service units in the model. The bill of materials is used to manufacture the production aircraft.

Yet another embodiment of the present disclosure provides a method for creating a passenger service unit layout for a production aircraft. Passenger seat configuration information describing seat locations and overhead bin configuration information describing overhead service unit length ranges for the production aircraft is identified by a computer system. Lengths available for placing passenger service units in the production aircraft are determined by the computer system using the passenger seat configuration information and the overhead bin configuration information for the production aircraft. The passenger service units are placed by the computer system in the lengths using a set of priority rules for the passenger service units to determine placements of the passenger service units, wherein the set of priority rules specify a priority in placing different types of the passenger service units. A model of a three-dimensional passenger service unit layout with determined placements for the passenger service units for the production aircraft is generated by the computer system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 8A-8C are an illustration of a two-dimensional installation drawing in accordance with an illustrative embodiment;

FIGS. 9A-9B are another illustration of a two-dimensional installation drawing in accordance with an illustrative embodiment;

FIGS. 10A-10B are yet another illustration of a two-dimensional installation drawing in accordance with an illustrative embodiment;

DETAILED DESCRIPTION

The illustrative embodiments recognize and take into account one or more different considerations. For example, the illustrative embodiments recognize and take into account that placing passenger service units into a design for production aircraft can involve many factors. The illustrative embodiments recognize and take into account that placement of passenger service units can be made using a number of different rules. These rules can be based on at least one of government regulations, manufacture specifications, or customer preferences. The government regulations can be, for example, Federal Aviation Administration (FAA) rules.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Thus, the illustrative embodiments provide a method, apparatus, and system for creating a passenger service unit layout for a production aircraft. The process identifies passenger seat configuration information describing seat locations and overhead bin configuration information describing overhead service unit length ranges for the production aircraft. The process determines lengths available for placing passenger service units in the production aircraft using the passenger seat configuration information and overhead bin configuration information for the production aircraft. The process places the passenger service units in the lengths in a model using the set of priority rules for the passenger service units to determine placements of the passenger service units. The set of priority rules specifies a priority in placing different types of the passenger service units. The model is digital data comprising data points in a space and information about the placed passenger service units. The process generates a model of a three-dimensional passenger service unit layout with the determined placements for the passenger service units for the production aircraft.

As used herein, a "set of," when used with reference to items, means one or more items. For example, a "set of priority rules" is one or more priority rules.

Figure 1:
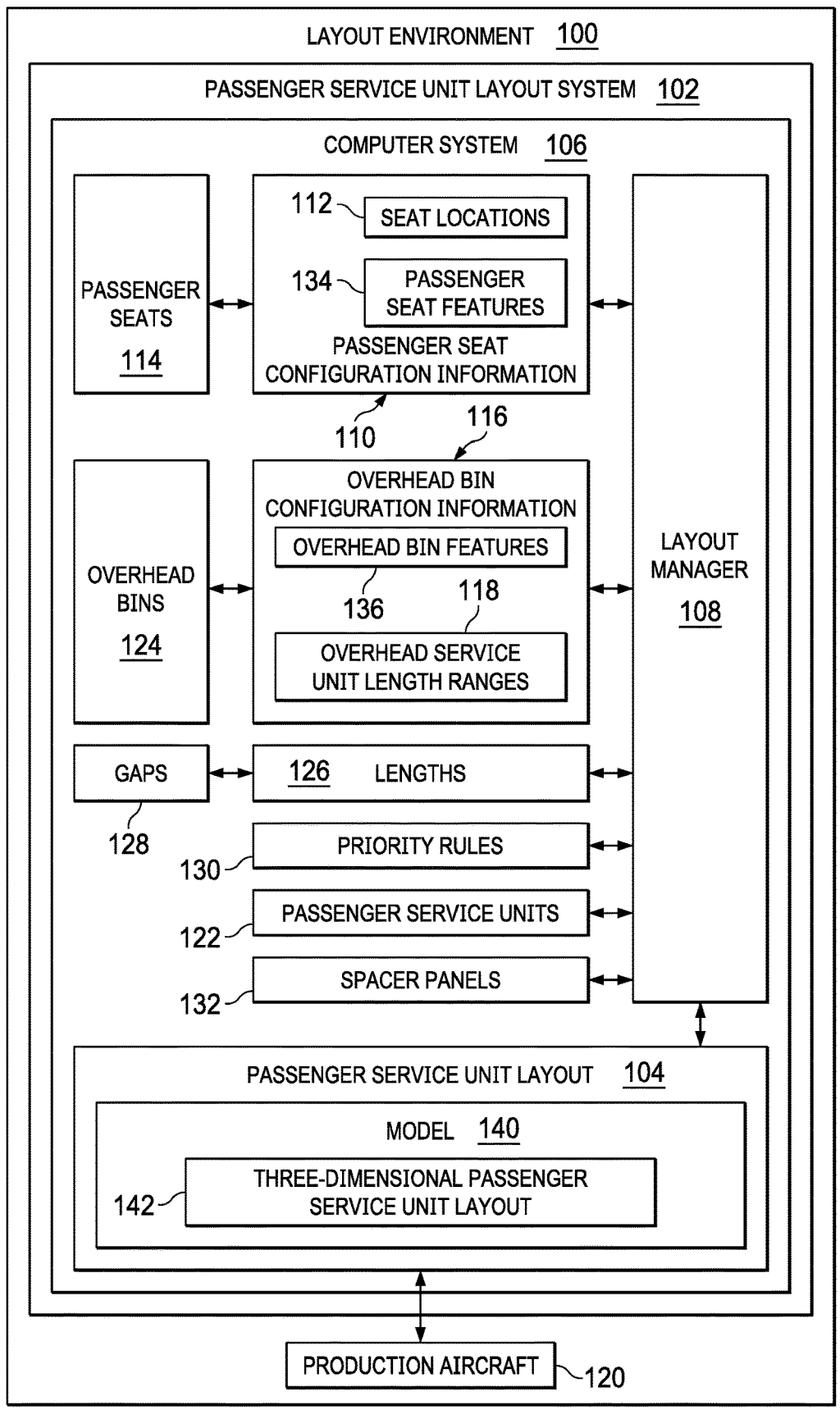
FIG. 1 is an illustration of a block diagram of a layout environment in accordance with an illustrative embodiment.

With reference now to the figures and, in particular, with reference to FIG. 1, an illustration of a block diagram of a layout environment is depicted in accordance with an illustrative embodiment. In this illustrative example, layout environment 100 is an environment in which passenger service unit layout system 102 creates passenger service unit layout 104.

In this illustrative example, passenger service unit layout system 102 comprises computer system 106 and layout manager 108. Layout manager 108 is located in computer system 106.

As depicted, layout manager 108 can be implemented in software, hardware, firmware, or a combination thereof. When software is used, the operations performed by layout manager 108 can be implemented in program code configured to run on hardware, such as a processor unit. When firmware is used, the operations performed by layout manager 108 can be implemented in program code and data and stored in persistent memory to run on a processor unit. When hardware is employed, the hardware can include circuits that operate to perform the operations in layout manager 108.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 106 is a physical hardware system and includes one or more data processing systems. When more than one data processing system is present in computer system 106, those data processing systems are in communication with each other using a communications medium. The communications medium can be a network. The data processing systems can be selected from at least one of a computer, a server computer, a tablet computer, or some other suitable data processing system.

In this illustrative example, layout manager 108 is configured to perform a number of different operations. For example, layout manager 108 is configured to identify passenger seat configuration information 110 describing seat locations 112 for passenger seats 114. Layout manager 108 is also configured to identify overhead bin configuration information 116 describing overhead service unit length ranges 118 for production aircraft 120. Production aircraft 120 is an aircraft that is being produced or manufactured for customers.

As depicted, passenger seat configuration information 110 can also include passenger seat features 134 for passenger seats 114 in addition to seat locations 112. These features can include, for example, dimensions for features such as a seat cushion, a seat pan, a seat direction, a type of seat, a cabin class, a seat pitch, a recline distance, and other features. In this illustrative example, overhead bin configuration information 116 can also include information about overhead bin features 136 for overhead bins 124. These features can include, for example, dimensions and locations of overhead bins 124, framework structure such as passenger service unit rail locations, passenger service unit rail lengths, or other suitable information.

As depicted, layout manager 108 is also configured to determine lengths 126 available for placing passenger service units 122 in production aircraft 120 using passenger seat configuration information 110 and overhead bin configuration information 116 for production aircraft 120.

For example, seat locations 112 for passenger seats 114 can be determined from passenger seat configuration information 110. Overhead service unit length ranges 118 can be determined from the locations of overhead bins 124. Overhead bin features 136 in overhead bin configuration information 116 can include information about rails used to attach overhead bins 124 to the interior of production aircraft 120. This information about overhead bin features 136 in overhead bin configuration information 116 about the rails can be used to determine overhead service unit length ranges 118. In other words, the lengths of the rails can describe or define overhead service unit length ranges 118.

Seat locations 112 for passenger seats 114 along with overhead service unit length ranges 118 can be used to determine the portions of overhead service unit length ranges 118 that can be used to place passenger service units 122. These portions of overhead service unit length ranges 118 are lengths 126 in this illustrative example.

Layout manager 108 is configured to place passenger service units 122 in lengths 126 using a set of priority rules 130 for passenger service units 122 to determine placement of passenger service units 122. In this illustrative example, the set of priority rules 130 specifies a priority in placing different types of passenger service units 122. The set of priority rules 130 can be used to determine what passenger service units are required versus what passenger service units are optional. Further, the set of priority rules 130 can be used to determine at least one of location, order, or other types of placement for passenger service units 122 in lengths 126 for overhead service unit length ranges 118.

In the illustrative example, the set of priority rules 130 can define which types of passenger service units 122 have a priority over other types of passenger service units 122. Further, the set of priority rules 130 can also specify where a particular passenger service unit should be placed with respect to a seat in passenger seats 114. The set of priority rules 130 defines a set of priorities for placing passenger service units 122 and can be based on at least one of Federal Aviation Agency (FAA) rules, manufacturer rules, customer preferences, or other suitable sources of rules, regulations, specifications, or preferences that can be used to determine the set of priority rules 130.

In this illustrative example, the set of priority rules 130 is specific for production aircraft 120. Different aircraft can have different sets of priority rules 130. Even aircraft of the same model and type can have different sets of priority rules 130. The set of priority rules 130 can vary depending on at least one of a customer, the manufacturer, or applicable government regulations.

With the placement of passenger service units 122 using priority rules 130, gaps 128 can be present in lengths 126 between groupings of one or more of passenger service units 122. Thus, groupings of passenger service units 122 can be present in which some of passenger service units 122 are not contiguous with other passenger service units 122, resulting in one or more of gaps 128.

In the illustrative example, layout manager 108 can place spacer panels 132 in gaps 128 between passenger service units 122 placed in lengths 126 in model 140. With the placement of passenger service units 122 and spacer panels 132 in gaps 128 between passenger service units 122 in lengths 126, passenger service unit layout 104 can be generated for overhead service unit length ranges 118 in production aircraft 120.

As depicted, layout manager 108 is configured to generate model 140 of three-dimensional passenger service unit layout 142 with the determined placements for passenger service units 122 for production aircraft 120. In this illustrative example, model 140 is a digital model and comprises digital data. The digital data comprises data points in space and information about placed passenger service units. In some illustrative examples, the placement of passenger service units 122 in lengths 126 can be a part of generating model 140. Model 140 can take a number of different forms such as a three-dimensional model or a computer-aided design model.

Model 140 forms passenger service unit layout 104 for production aircraft 120. This model can be used to perform various operations during at least one of manufacturing or maintenance to install or reconfigure passenger service units 122 in production aircraft 120. For example, model 140 can be used in a manufacturing or maintenance system to automatically generate work orders for performing operations such as installing passenger service units 122, moving passenger service units 122, removing passenger service units 122, or some combination thereof.

Figure 2:
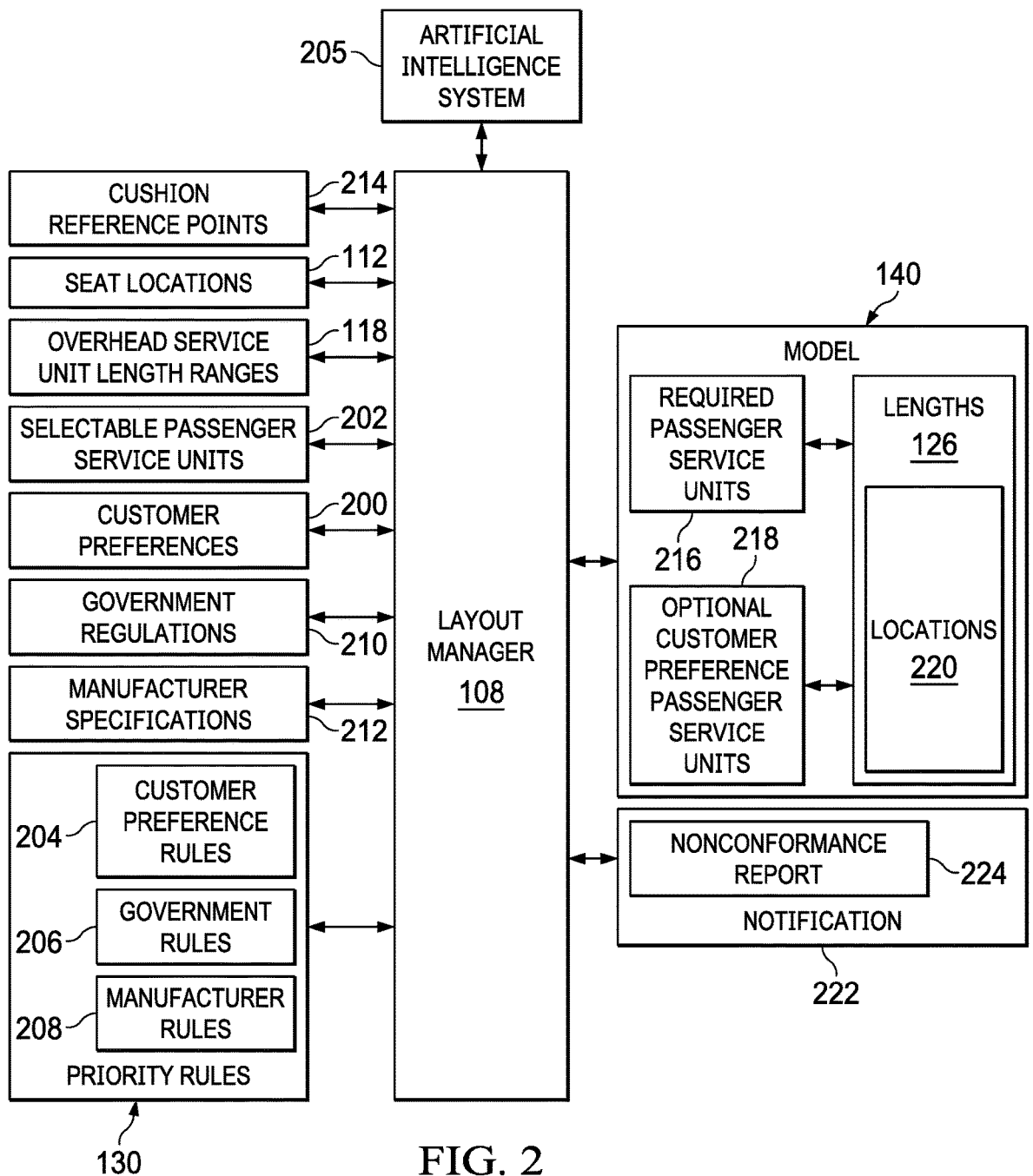
FIG. 2 is an illustration of a block diagram illustrating dataflow in generating a model of a three-dimensional passenger service unit layout in accordance with an illustrative embodiment.

With reference now to FIG. 2, an illustration of a block diagram illustrating dataflow in generating a model of a three-dimensional passenger service unit layout is depicted in accordance with an illustrative embodiment. In the illustrative examples, the same reference numeral may be used in more than one figure. This reuse of a reference numeral in different figures represents the same element in the different figures.

As depicted, layout manager 108 determines customer preferences 200 for placement of passenger service units 122 in production aircraft 120 in FIG. 1. Customer preferences 200 can include an identification of desired ones of passenger service units 122. For example, customer preferences 200 can be used to select passenger service units 122 from a plurality of selectable passenger service units 202. In this illustrative example, selectable passenger service units 202 are passenger service units of different types. For example, customer preferences 200 may select a particular type of overhead light. Different options for overhead lights can be considered different types of selectable passenger service units 202.

These customer preferences can be used to generate a set of customer preference rules 204 for use in priority rules 130. As depicted, these rules could be generated by layout manager 108 or specified by a human operator. In this illustrative example, layout manager 108 can employ artificial intelligence system 205 to generate the set of customer preference rules 204 from customer preferences 200.

In this illustrative example, artificial intelligence system 205 is a system that has intelligent behavior and can be based on the function of a human brain. An artificial intelligence system comprises at least one of an artificial neural network, a cognitive system, a Bayesian network, a fuzzy logic, an expert system, a natural language system, or some other suitable system. Machine learning is used to train the artificial intelligence system. Machine learning involves inputting data to the process and allowing the process to adjust and improve the function of the artificial intelligence system.

A cognitive system is a computing system that mimics the function of the human brain. The cognitive system can be, for example, IBM Watson available from International Business Machines Corporation.

Additionally, layout manager 108 identifies a set of government rules 206 and a set of manufacturer rules 208. These rules can be derived from government regulations 210 and manufacturer specifications 212, respectively. The government regulations can be, for example, Federal Aviation Administration (FAA) rules. For example, Federal Aviation Administration rules can specify the placement of passenger service units 122 in the form of oxygen dispensing systems. These rules for the set of priority rules 130 can also be generated by using artificial intelligence system 205 or by a human operator.

In this illustrative example, the set of priority rules 130 can specify a number of different things. For example, the set of priority rules 130 can select which passenger service units have priority in placement over other passenger service units if a conflict in placement occurs. For example, a conflict in placement can occur between a first passenger service unit that is to be placed in a location based on customer preferences and a second passenger service unit that is to be placed in the same location based on manufacturer rules 208. In some cases, manufacturer rules 208 are optional, allowing customer preference rules 204 to take priority. In other cases, manufacturer rules 208 may take priority over customer preference rules 204 for performance or safety reasons. These priorities, as well as others, can be embodied within the set of priority rules 130.

In this illustrative example, the set of priority rules 130 is specific to production aircraft 120 in FIG. 1. In other words, different instances or builds of the same model of an aircraft can have different priority rules. For example, a customer may have different customer preferences for two production aircraft of the same model. As a result, the different sets of priority rules are applied to each of the production aircraft.

As depicted, layout manager 108 determines lengths 126 that are available for placing passenger service units 122 in FIG. 1. In this illustrative example, layout manager 108 can make this determination using seat locations 112 in passenger seat configuration information 110 in FIG. 1 and overhead service unit length ranges 118 in overhead bin configuration information 116 in FIG. 1.

In this illustrative example, layout manager 108 can place passenger service units 122 in FIG. 1 that have been selected for placement using information from passenger seat features 134 in passenger seat configuration information 110 in FIG. 1. For example, layout manager 108 can use cushion reference points 214 in passenger seat features 134 for passenger seats 114 in FIG. 1. As depicted, a cushion reference point (CRP) is an intersection of a plane of a seat cushion or a passenger seat with a plane perpendicular to a seat pan for passengers which touches the forward-most surface of an uncompressed center of a seat back for the passenger seat.

In other examples, other types of features can be used to determine lengths 126 that can be used to place passenger service units 122 in FIG. 1. Other features can also include, for example, overhead flight crew rest and overhead flight attendant rest placements, underbin closet or class divider locations, lavatory and galley locations, or other features that can affect the locations, the lengths of locations, and customer seating selections.

In this illustrative example, cushion reference points 214 can be used to determine locations of passengers when determining placement of passenger service units 122. For example, the location of the passengers can be used to determine a field-of-view of a passenger, what can be reached by a passenger, and other suitable information that can be used with the set of priority rules 130 to determine the placement of passenger service units 122.

A number of different types of passenger service units 122 are present. As depicted, passenger service units 122 include required passenger service units 216. The placement of these passenger service units is performed by layout manager 108 in FIG. 1 using the set of priority rules 130. The placement includes which passenger service units can be placed as well as locations 220 for passenger service units 122 along lengths 126 in production aircraft 120. In other words, within each one of lengths 126, passenger service units 122 in a length will have a particular order. This order within the length is based on the set of priority rules 130 in this illustrative example.

In placing passenger service units 122 in locations 220 in lengths 126 in model 140, layout manager 108 can place required passenger service units 216 in locations 220 in lengths 126 in model 140. In this illustrative example, required passenger service units 216 can be specified by at least one of a government rule in government rules 206 or a manufacturer rule in manufacturer rules 208.

In this illustrative example, layout manager 108 can place optional customer preference passenger service units 218 in locations 220 in lengths 126 in model 140 after placing required passenger service units 216. Optional customer preference passenger service units 218 are considered optional because these passenger service units have a lower priority as compared to required passenger service units 216.

As a result, if insufficient space is present in lengths 126, some or all of optional customer preference passenger service units 218 may be left out of model 140. Alternatively, these optional customer preference passenger service units may be in model 140, but are unplaced within model 140.

Further, layout manager 108 can shift positions of prior-placed passenger service units in order to form a placement of optional customer preference passenger service units 218. The shifting of positions can be for at least one of optional customer preference passenger service units 218 or required passenger service units 216.

Further, layout manager 108 can provide notification 222 that a particular passenger service unit was not placed when such placement could not be made in accordance with the set of priority rules 130. This notification can be made in a number of different ways. For example, notification 222 can be nonconformance report 224 that identifies each passenger service unit that could not be placed in model 140.

Figure 3:
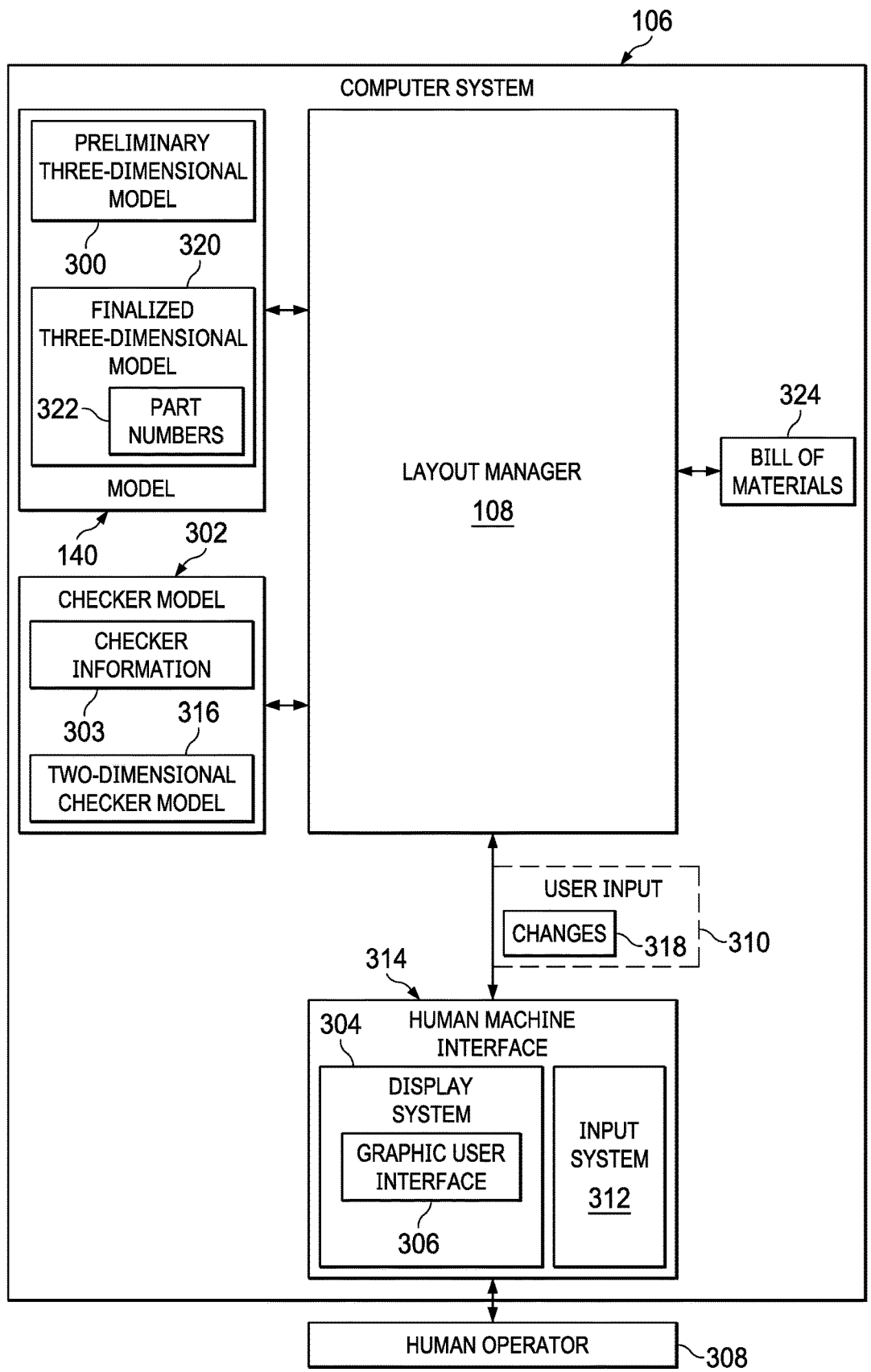
FIG. 3 is an illustration of a block diagram illustrating dataflow in processing user input as part of generating a model of a three-dimensional passenger service unit layout in accordance with an illustrative embodiment.

Turning next to FIG. 3, an illustration of a block diagram illustrating dataflow in processing user input as a part of generating a model of a three-dimensional passenger service unit layout is depicted in accordance with an illustrative embodiment. As depicted, model 140 generated by layout manager 108 in FIG. 1 and FIG. 2 can be preliminary three-dimensional model 300.

In this illustrative example, layout manager 108 creates checker model 302 from preliminary three-dimensional model 300. Checker model 302 is a model of placed passenger service units in production aircraft 120 in FIG. 1. Checker model 302 includes checker information 303. In this illustrative example, checker information 303 is information that can be used to review placement of passenger service units 122 in FIG. 1 in preliminary three-dimensional model 300. For example, checker information 303 can include at least one of cushion reference point (CRP) lines, maximum seat recline, minimum seat distances from specific passenger service units, seat distance assignments from passenger service units, and other information that may be used to determine whether the placement of passenger service units 122 in preliminary three-dimensional model 300 requires changes or corrections.

In one illustrative example, checker information 303 may include an identification of nonconformances with respect to optional customer preference passenger service units 218 in FIG. 2 that could not be placed to meet priority rules 130 in FIGS. 1-2. In this case, an optional customer preference passenger service unit that has been placed can be swapped out for an optional customer preference passenger service unit that was not placed.

In this illustrative example, checker model 302 is displayed in display system 304. In this illustrative example, display system 304 is a physical hardware system and includes one or more display devices on which graphical user interface 306 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

As depicted, checker model 302 is displayed to human operator 308. Human operator 308 is a person that can interact with graphical user interface 306 through user input 310 generated by input system 312 for computer system 106. Input system 312 is a physical hardware system and can be selected from at least one of a mouse, a keyboard, a trackball, a touchscreen, a stylus, a motion-sensing input device, a cyber glove, or some other suitable type of input device. Display system 304 and input system 312 form human machine interface (HMI) 314.

As depicted, checker model 302 displayed on graphical user interface 306 in display system 304 is two-dimensional checker model 316. The use of two-dimensional checker model 316 can make reviewing checker information 303 in checker model 302 easier. In other illustrative examples, checker model 302 can be a three-dimensional checker model.

In this illustrative example, layout manager 108 receives a set of changes 318 in user input 310 generated by human operator 308. The set of changes 318 can take a number of different forms. For example, the set of changes 318 can include at least one of an addition of a passenger service unit, a removal of the passenger service unit, a relocation of the passenger service unit, or other suitable changes.

As depicted, layout manager 108 updates preliminary three-dimensional model 300 to form finalized three-dimensional model 320 when the set of changes 318 is made to preliminary three-dimensional model 300 through human machine interface 314.

Thus, human operator 308 is a user who can manipulate preliminary three-dimensional model 300 after checking passenger seat unit placements in checker model 302 using checker information 303. Human operator 308 can make adjustments to preliminary three-dimensional model 300 in the form of a set of changes 318. In applying these changes, layout manager 108 can generate finalized three-dimensional model 320.

Further, in forming finalized three-dimensional model 320, layout manager 108 can also identify part numbers 322 and associate part numbers 322 with passenger service units 122 in FIG. 1 in finalized three-dimensional model 320. Part numbers 322 can be identified from a number of different sources. For example, a database of part numbers and vendors for production aircraft 120 in FIG. 1 can be searched for part numbers 322.

Finalized three-dimensional model 320 can be used by layout manager 108 to generate bill of materials 324. Bill of materials 324 includes information needed to manufacture production aircraft 120 and, in particular, to install passenger service units 122 in production aircraft 120 in FIG. 1. Bill of materials 324 can include a list of raw materials, subassemblies, intermediate assemblies, subcomponents, quantities, and other information used to manufacture a product.

In one illustrative example, one or more technical solutions are present that overcome a technical problem with the amount of time and effort needed to generate passenger service unit layouts for aircraft with current techniques. As a result, one or more technical solutions can provide a technical effect of reducing the amount of time and effort used to create passenger service unit layouts with currently used techniques.

Computer system 106 can be configured to perform at least one of the steps, operations, or actions described in the different illustrative examples using software, hardware, firmware, or a combination thereof. As a result, computer system 106 operates as a special purpose computer system in which layout manager 108 in computer system 106 enables automated placement of passenger service units 122 to generate a passenger service unit layout. In particular, layout manager 108 transforms computer system 106 into a special purpose computer system as compared to currently available general computer systems that do not have layout manager 108.

In the illustrative example, the use of layout manager 108 in computer system 106 integrates processes into a practical application for a method that enables automatically generating a passenger service layout that can be used to produce an aircraft. In other words, layout manager 108 in computer system 106 is directed to a practical application of processes integrated into layout manager 108 in computer system 106 that identifies passenger seat configuration information 110 and overhead bin configuration information 116. Layout manager 108 determines lengths 126 available for placing passenger service units 122 in production aircraft 120 using passenger seat configuration information 110 and overhead bin configuration information 116. Passenger service units 122 are placed using the priority rules that specify priority in placing different types of passenger service units 122. Layout manager 108 generates a model with three-dimensional passenger service unit layout 142 with the determined placements for passenger service units 122 for the production aircraft. This model is a digital model such as a computer-aided design (CAD), a computer aided manufacturing (CAM) model, or other suitable type of model that is used by computer system 106.

The illustrations of layout environment 100 and the different components in FIGS. 1-3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

In the illustrative example, passenger seat configuration information 110, overhead bin configuration information 116, model 140, priority rules 130, customer preferences 200, government regulations 210, manufacture specifications 212, and other information can be stored in many different locations. For example, these and other information used by layout manager 108 can be stored locally, distributed in databases within computer system 106, or other locations. Further, information can be stored in a cloud storage in which the information is digital data stored in logical pools.

Figure 4:
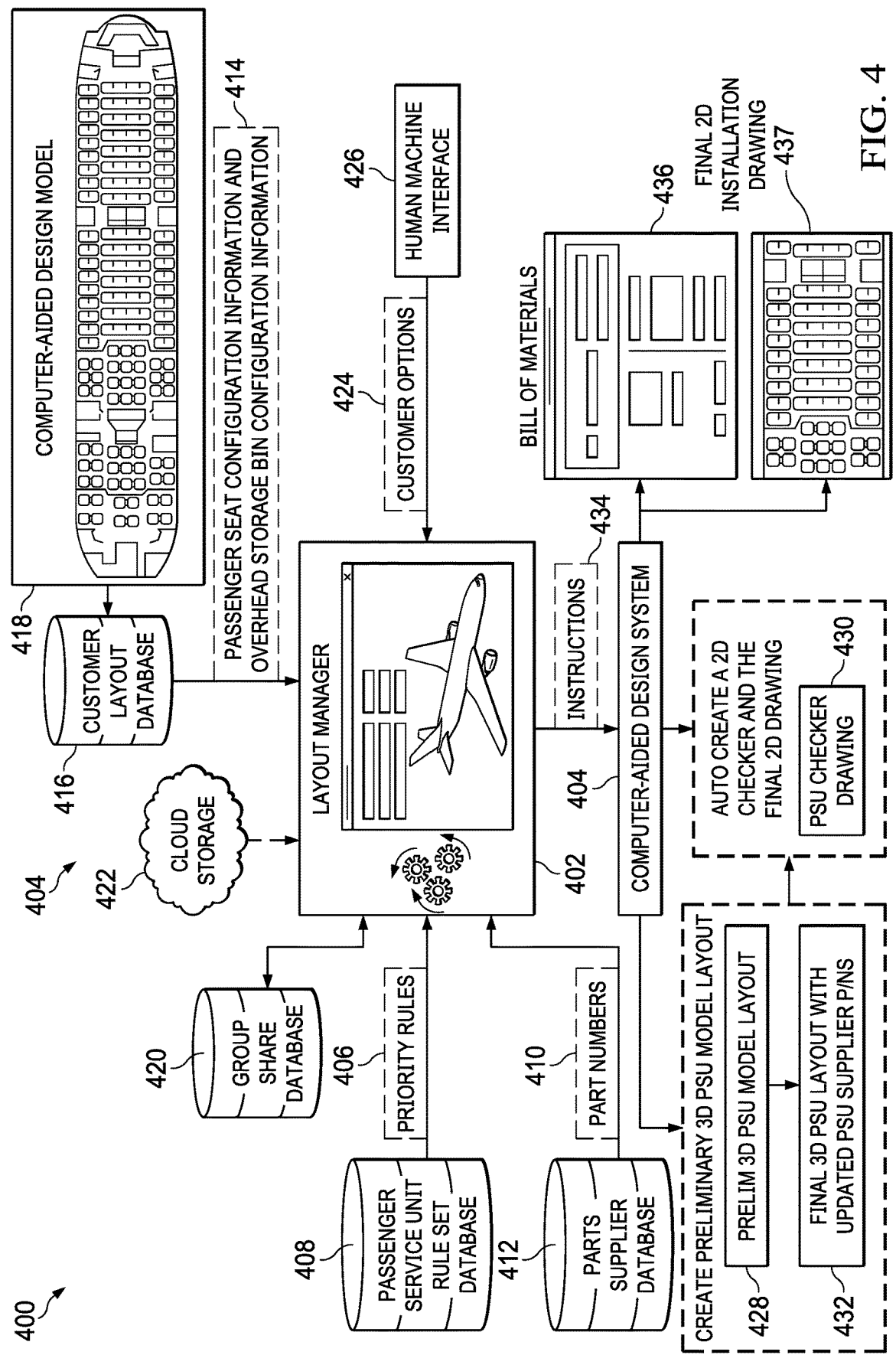
FIG. 4 is an illustration of a block diagram depicting a creation of models of a three-dimensional passenger service unit layout in accordance with an illustrative embodiment.

With reference to FIG. 4, an illustration of a block diagram depicting a creation of models of a three-dimensional passenger service unit layout is depicted in accordance with an illustrative embodiment. In this illustrative example, passenger service unit layout system 400 is an example of an implementation for passenger service unit layout system 102 in FIG. 1. As depicted, passenger service unit layout system 400 includes layout manager 402 and computer-aided design system 404.

In this illustrative example, layout manager 402 receives input from a number of different sources for generating a three-dimensional model for a passenger service unit layout in a production aircraft. For example, layout manager 402 receives priority rules 406 from passenger service unit rule set database 408. Layout manager 402 also receives part numbers 410 from parts supplier database 412. Part numbers 410 are part numbers for passenger service units that may be placed into a passenger service unit layout.

In this illustrative example, layout manager 402 also receives passenger seat configuration information and overhead stowage bin configuration information 414 from customer layout database 416. In this illustrative example, information in customer layout database 416 is extracted from computer-aided design model 418 for the aircraft of interest. Further, customer options 424 for passenger service units can be received from human machine interface 426. These options are also referred to as customer passenger service unit options in this illustrative example. These options can include, for example, what passenger service units are desired, the locations, and other information that form customer preferences.

In this illustrative example, the information retrieved by layout manager 402 can be saved to group shared database 420. In this illustrative example, this database contains information that is used by layout manager 402 to determine placements of passenger service units in a model for the placements. This database provides a central location for the information needed by layout manager 402.

In some illustrative examples, one or more of the sources of information used by layout manager 402 can be located in cloud storage 422 which can be accessed over a network including the Internet. For example, parts supplier database 412 and customer layout database 416 can be located in cloud storage 422. As another example, group shared database 420 can also be located in cloud storage 422.

As depicted, layout manager 402 automatically creates preliminary three-dimensional passenger service unit model layout 428. In this illustrative example, layout manager 402 creates this model by sending instructions 434 to computer-aided design system 404. As depicted, instructions 434 can be program code, commands, data, or other suitable information needed by computer-aided design system 404 to generate models or update models under the control of layout manager 402.

Computer-aided design system 404 comprises one or more computer-aided design programs. For example, the set of computer-aided design programs can include at least one of CATIA, available from Dassault Systemes SE, Solid-Works, available from Dassault Systemes SE, AutoCAD, available from Autodesk, Inc., or other suitable computer-aided design programs or applications.

As depicted, preliminary three-dimensional passenger service unit model layout 428 is a computer model such as a computer-aided design model. Layout manager 402 also automatically creates passenger service unit checker drawing 430 from preliminary three-dimensional passenger service unit model layout 428 by sending instructions 434 to computer-aided design system 404. Passenger service unit checker drawing 430 is a two-dimensional model in this depicted example. In other examples, passenger service unit checker drawing 430 can be a three-dimensional model.

In this illustrative example, layout manager 402 uses information from preliminary three-dimensional passenger service unit model layout 428 that is needed to verify or check the placement of passenger service units. Further, passenger service unit checker drawing 430 also may include any communications or indications to emphasize or bring attention to checker information used to check or verify the placement of the passenger service units.

Passenger service unit checker drawing 430 can be displayed to a human operator on human machine interface 426. Additionally, preliminary three-dimensional passenger service unit model layout 428 can also be displayed on human machine interface 426. The human operator can view and make changes to preliminary three-dimensional passenger service unit model layout 428 to create final three-dimensional passenger service unit model layout 432. In this illustrative example, final three-dimensional passenger service unit model layout 432 also includes part numbers 410 for the passenger service units and other components that may be used with the passenger service units or to install the passenger service units.

In another illustrative example, the human operator can make a change to passenger service unit checker drawing 430 displayed in human machine interface 426. In this case, layout manager 402 can update preliminary three-dimensional passenger service unit model layout 428 using the changes made to passenger service unit checker drawing 430.

Layout manager 402 can then generate bill of materials 436 and final two-dimensional installation drawing 437 using final three-dimensional passenger service unit layout 432. Using final three-dimensional passenger service unit layout 432, passenger service unit layout system 102 in FIG. 1 and layout manager 402 are configured to generate two-dimensional installation drawings that include, for the particular aircraft, an identification of the selected passenger service unit components (from a plurality of different passenger service unit components) that are determined to be installed at each of a plurality of seat locations. Passenger service unit layout system 102 and layout manager 402 are further configured to generate, using final three-dimensional passenger service unit layout 432, installation instructions for use with the two-dimensional installation drawings, for installation of the determined components at each of the plurality of seat locations, to produce the determined passenger service unit layout on the particular aircraft. Layout manager 402 is configured to output the generated two-dimensional installation drawings and/or final to the work station for the particular aircraft, along with a bill of material and identified components, for producing the determined particular passenger service unit layout on the particular aircraft. Bill of materials 436 can be used to locate, manufacture, or purchase passenger service units. Further, bill of materials 436 can also be used in generating work orders or other instructions for installing passenger service units in a production aircraft.

Figure 5:
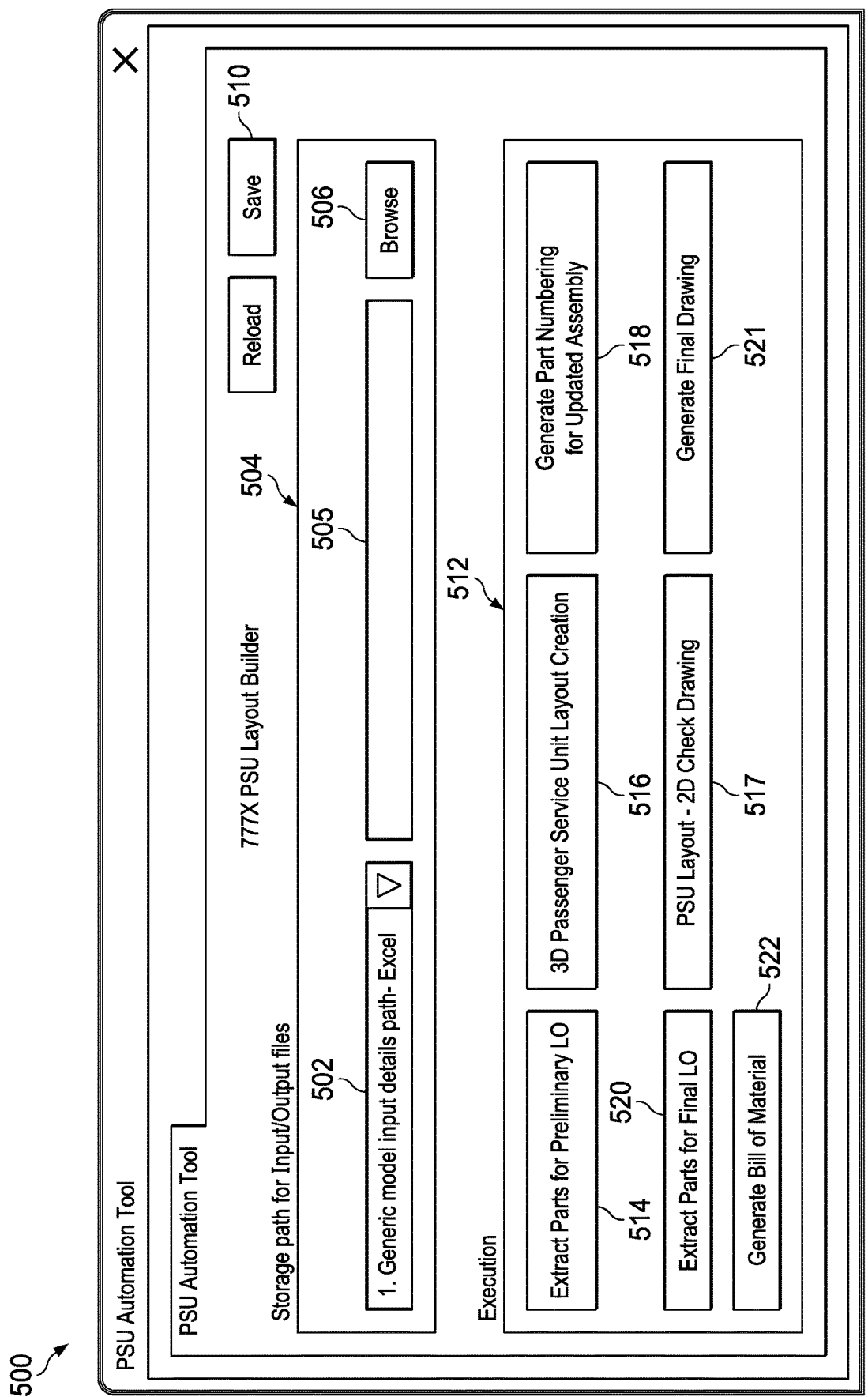
FIG. 5 is an illustration of a passenger service unit layout screen in accordance with an illustrative embodiment.
Figure 6:
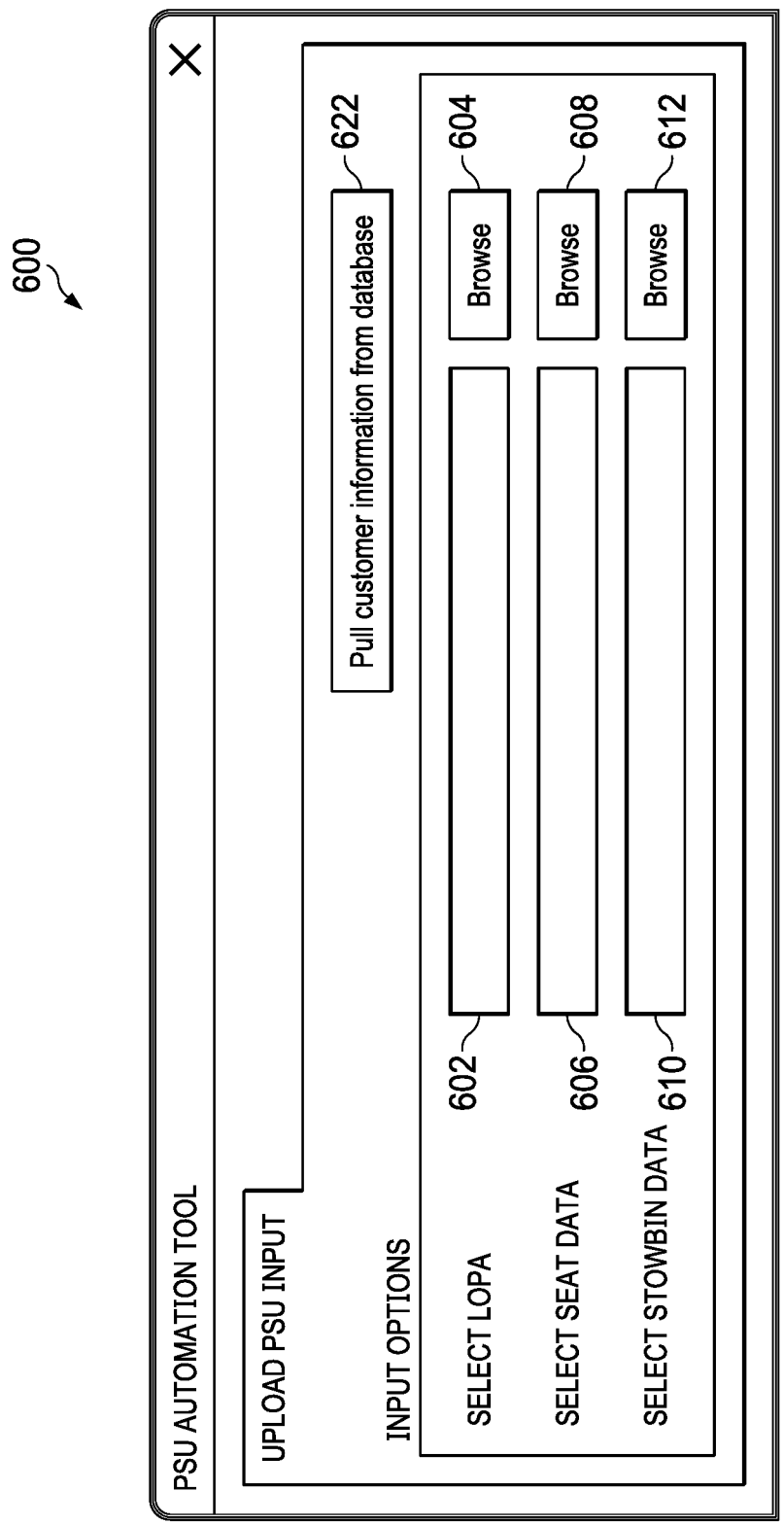
FIG. 6 is an illustration of a configuration information input screen in accordance with an illustrative embodiment.
Figure 7:
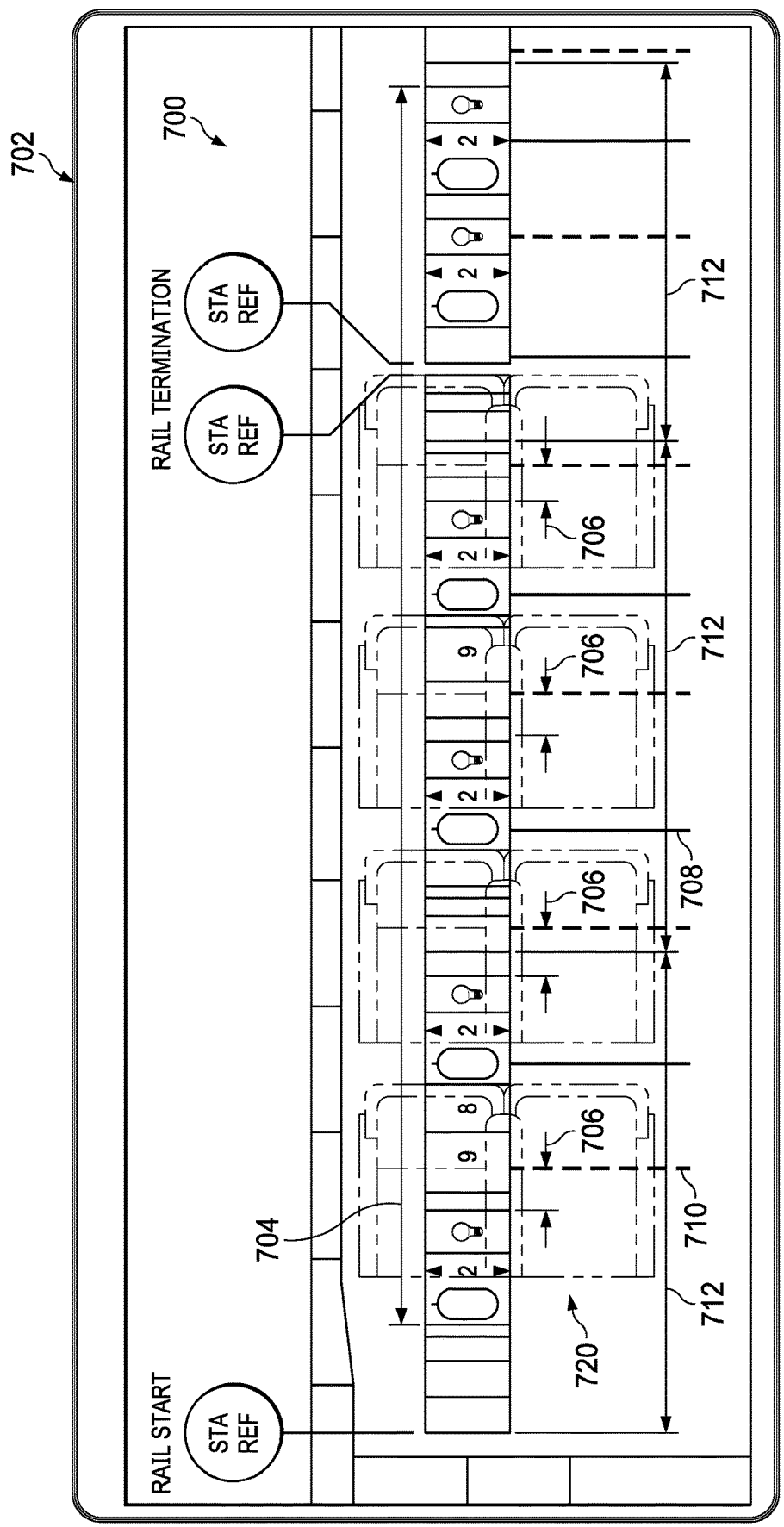
FIG. 7 is an illustration of a two-dimensional checker drawing in accordance with an illustrative embodiment.

In the illustrative examples, FIGS. 5-7 are examples of screens that can be displayed in graphical user interface 306 in display system 304 in human machine interface 314 in FIG. 3. The screens are some examples of screens that can be used by human operator 308 to generate user input 310 in FIG. 3 to create model 140 of three-dimensional passenger service unit layout 142 for production aircraft 120 in FIG. 1. This model can be used to manufacture or perform maintenance on production aircraft 120.

With reference now to FIG. 5, an illustration of a passenger service unit layout screen is depicted in accordance with an illustrative embodiment. In this illustrative example, passenger service unit layout screen 500 is an example of a screen that can be displayed in graphical user interface 306 in display system 304 for human machine interface 314 to enable human operator 308 in FIG. 3 to create a passenger service unit layout.

File path field 502 in input section 504 in passenger service unit layout screen 500 enables a user to select different types of input and output. For example, the input can be part numbers, passenger seat and overhead bin configuration information, or other types of input. The output can be a preliminary passenger service unit layout, a final passenger service unit layout, or other suitable types of output.

Input field 505 enables a user to find locations of files containing input information such as a computer-aided design model that includes passenger seat configuration information and overhead bin configuration information, part numbers, priority rules, and other suitable information. Input field 505 can also be used to enter locations for output files.

Browse button 506 enables a user to browse files and folders for files containing input information. In this illustrative example, save button 510 allows the user to save inputs to input field 505 in input section 504.

In execution section 512, extract parts for preliminary layout button 514 can be selected to obtain models for parts in the preliminary three-dimensional passenger service unit layout. The models can be, for example, models of passenger service units and other components that may be used in creating the model of the three-dimensional passenger service unit layout. The models for the parts can be used to develop the three-dimensional passenger service unit layout model.

Components of three-dimensional passenger service layout creation button 516 can be selected to generate a model for a three-dimensional passenger service unit layout. When this button is selected, the process creates the model of the three-dimensional passenger service unit layout using the model parts that have been extracted for use in the layout.

Passenger service unit two-dimensional check drawing button 517 can be selected to generate a two-dimensional drawing with information for checking the placement of passenger service units. As depicted, generate part numbering for updated assembly button 518 can be used to generate the part numbers for inclusion in the model of the final three-dimensional passenger service unit layout.

As depicted, extract parts for final layout button 520 can be selected to obtain models that will be used in the final version of the passenger service unit layout. Once the parts have been extracted for the final layout, 3D passenger service unit layout creation button 516 can be selected to generate the final three-dimensional passenger service unit layout containing the part numbers for the passenger service units.

In this illustrative example, generate final drawing button 521 in passenger service unit layout screen 500 can be selected to generate a two-dimensional passenger service unit layout. Generate bill of material button 522 can be selected to generate a bill of material.

With reference to FIG. 6, an illustration of a configuration information input screen is depicted in accordance with an illustrative embodiment. In this illustrative example, configuration information input screen 600 is an example of a screen that can be used to select files for a layout of passenger seat accommodations, seat layout, input passenger seat configuration information, and overhead bin configuration information.

In this illustrative example, select layout of passenger seat accommodations field 602 is used to enter the location of a file containing the layout of the passenger seat accommodations. Browse button 604 can be used to search for the layout of the passenger seat accommodations file.

As depicted, select seat data field 606 is designed to receive the location of a file containing passenger seat configuration information. This file can be a model, a spreadsheet, or some other suitable type of file containing passenger seat configuration information. Browse button 608 can be used to search for the file containing the passenger seat configuration information.

In this illustrative example, select stowbin data field 610 is configured to receive the location of the file containing the stowage bin configuration information. Browse button 612 can be selected to search for this file.

In this illustrative example, pull customer information from database button 622 can be selected to automatically pull customer information from a database.

With reference next FIG. 7, an illustration of a two-dimensional checker drawing is depicted in accordance with an illustrative embodiment. Two-dimensional checker drawing 700 is displayed in screen 702. Two-dimensional checker drawing 700 in screen 702 is an example of a visualization of checker model 302 displayed in graphical user interface 306 in FIG. 3.

In this illustrative example, line 704 is the range of passenger service units that the Passenger Service Module (PSM) supports.

Line 706 identifies the distance between a reading light panel and a cushion reference point (CRP) for a seat row. Line 708 identifies a line for a maximum seat recline. Line 710 is a line for cushion reference points in a row of seats. Line 712 identifies the distance between passenger information signs. These are examples of information that can be used to check the placement of passenger seat units 720.

Figure 8A:
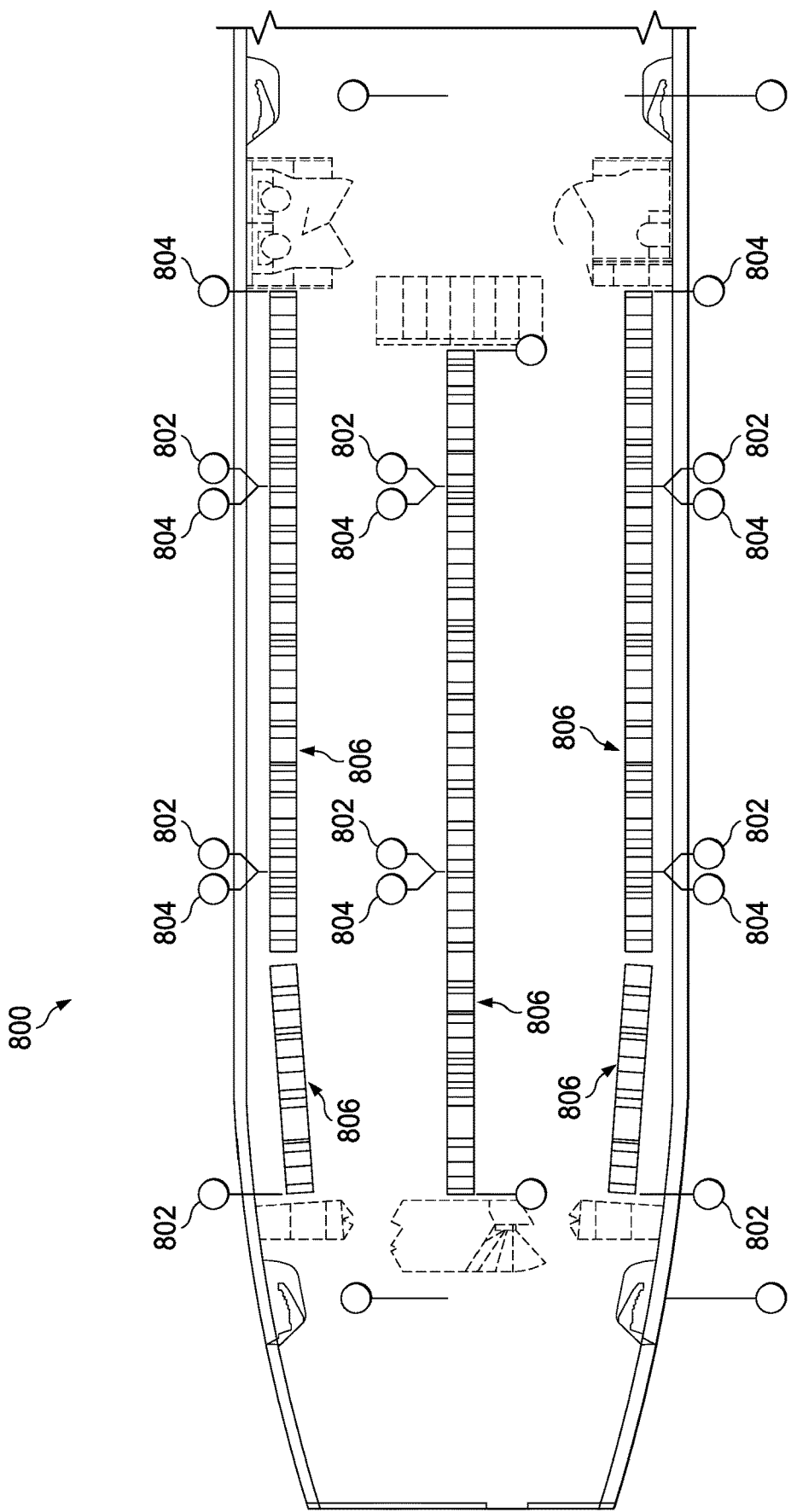

With reference next to FIGS. 8A-8C, an illustration of a two-dimensional installation drawing is depicted in accordance with an illustrative embodiment. Final two-dimensional installation drawing 800 is an example of final two-dimensional installation drawing 437 in FIG. 4. Two-dimensional installation drawing 800 can be used by human operators to install passenger service units in an aircraft.

As depicted, final two-dimensional installation drawing 800 depicts information used for installing personal service units in an aircraft. For example, final two-dimensional installation drawing 800 shows passenger service unit rail starts 802 and passenger service unit rail terminations 804. Passenger service unit layouts 806 are illustrated in final two-dimensional installation drawing 800.

Final two-dimensional installation drawing 800 also includes parts list 808. This list includes location information 810, part types 812, and part numbers 814 for the passenger service unit panels.

Figure 9A:
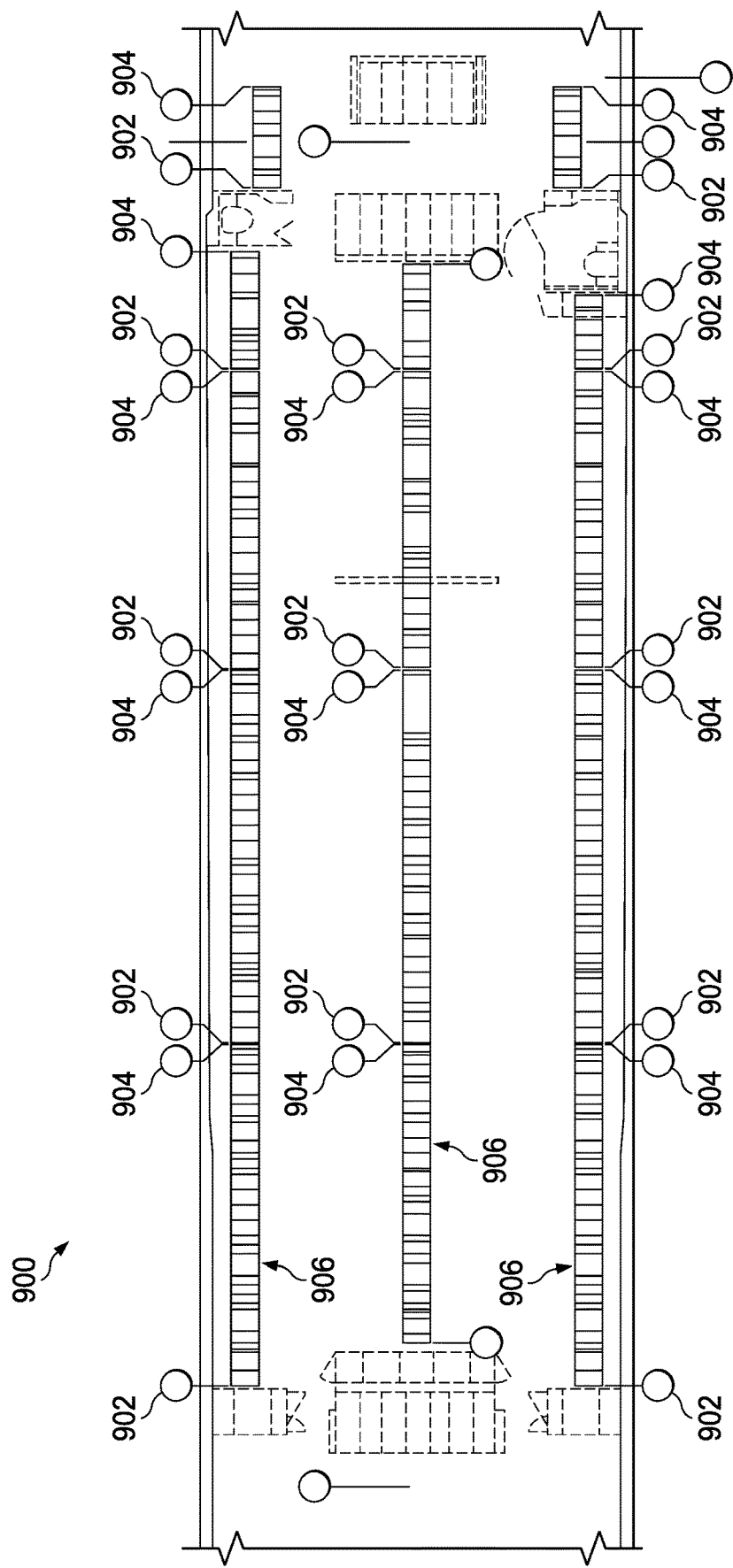

Turning now to FIGS. 9A-9B, another illustration of a two-dimensional installation drawing is depicted in accordance with an illustrative embodiment. In this illustrative example, final two-dimensional installation drawing 900 is an example of final two-dimensional installation drawing 437 in FIG. 4.

In this figure, final two-dimensional installation drawing 900 illustrates information used for installing personal service units in an aircraft. As depicted, final two-dimensional installation drawing 900 illustrates passenger service unit rail starts 902 and passenger service unit rail terminations 904. Passenger service unit layouts 906 also are illustrated in final two-dimensional installation drawing 900.

Further, final two-dimensional installation drawing 900 includes parts list 908. This list includes location information 910, part types 912, and part numbers 914 for the passenger service unit panels.

Figure 10A:
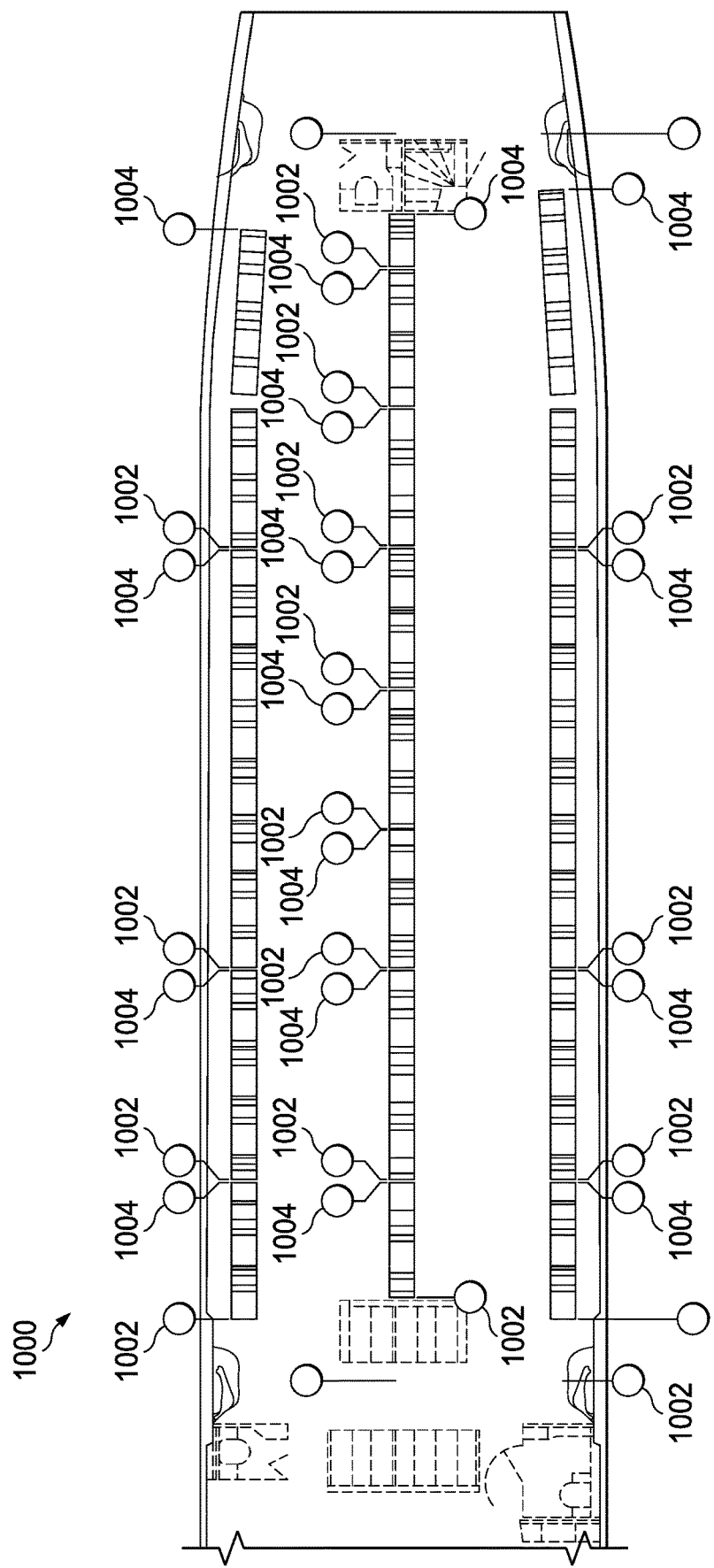

In FIGS. 10A-10B, yet another illustration of a two-dimensional installation drawing is depicted in accordance with an illustrative embodiment. Final two-dimensional installation drawing 1000 is another example of final two-dimensional installation drawing 437 in FIG. 4.

As depicted, final two-dimensional installation drawing 1000 depicts information used for installing personal service units in an aircraft. For example, final two-dimensional installation drawing 1000 shows passenger service unit rail starts 1002 and passenger service unit rail terminations 1004. As another example, passenger service unit layouts 1006 are illustrated in final two-dimensional installation drawing 1000.

Final two-dimensional installation drawing 1000 includes parts list 1008. As depicted, parts list 1008 includes location information 1010, part types 1012, and part numbers 1014 for the passenger service unit panels.

The final two-dimensional installation drawings illustrated in FIGS. 8-10 are examples of installation drawings that can be created for use in installing passenger service units and are not meant to limit the manner in which other final two-dimensional installation drawings can be implemented. For example, other final two-dimensional installation drawings can omit a parts list. The parts list can be in separate drawing. Additionally, other information such as installation notes can be included in other examples of final two-dimensional installation drawings.

Figure 11:
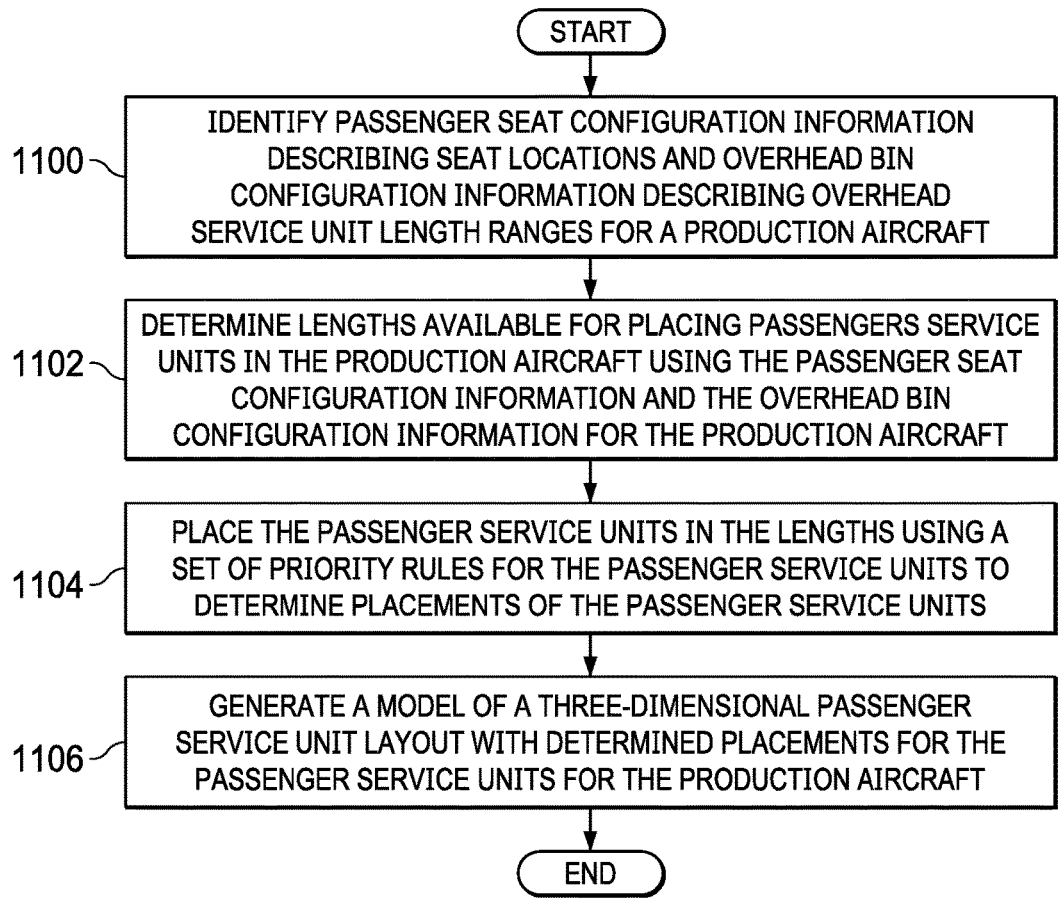
FIG. 11 is an illustration of a flowchart of a process for creating a passenger service unit layout for a production aircraft in accordance with an illustrative embodiment.

Turning next to FIG. 11, an illustration of a flowchart of a process for creating a passenger service unit layout for a production aircraft is depicted in accordance with an illustrative embodiment. The process in FIG. 11 can be implemented in hardware, software, or both. When implemented in software, the process can take the form of program code that is run by one or more processor units located in one or more hardware devices in one or more computer systems. For example, the process can be implemented in at least one of layout manager 108 in computer system 106 in FIG. 1 or layout manager 402 in FIG. 4.

The process begins by identifying passenger seat configuration information describing seat locations and overhead bin configuration information describing overhead service unit length ranges for a production aircraft (operation 1100). The process determines lengths available for placing passenger service units in the production aircraft using the passenger seat configuration information and the overhead bin configuration information for the production aircraft (operation 1102).

The process places the passenger service units in the lengths using a set of priority rules for the passenger service units to determine placements of the passenger service units (operation 1104). The set of priority rules specifies a priority in placing different types of the passenger service units. In this illustrative example, the set of priority rules is specific for the particular production aircraft for which the passenger service unit layout is being generated.

The process generates a model of a three-dimensional passenger service unit layout with the determined placements for the passenger service units for the production aircraft (operation 1106). The process terminates thereafter.

Figure 12:
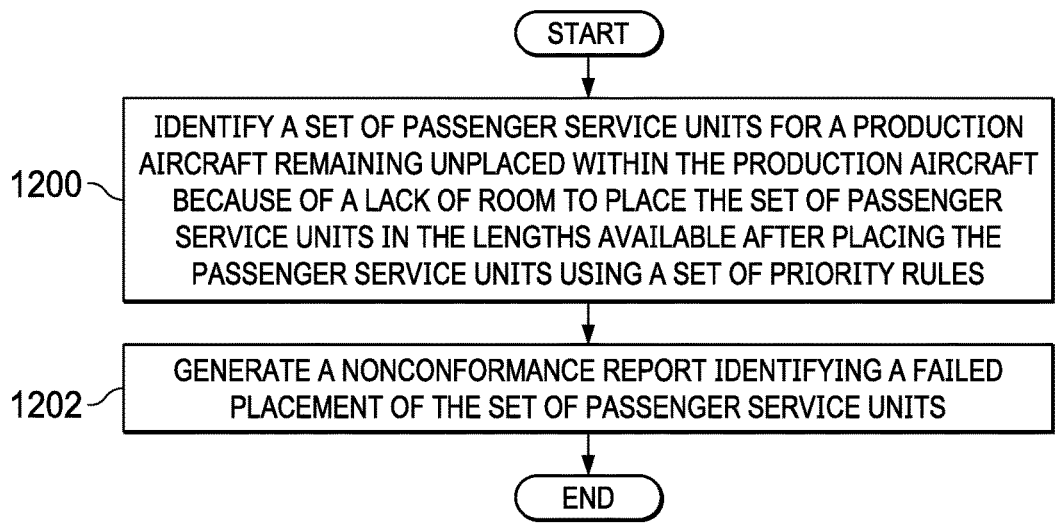
FIG. 12 is an illustration of a flowchart of a process for identifying unplaced passenger service units for a production aircraft in accordance with an illustrative embodiment.

With reference to FIG. 12, an illustration of a flowchart of a process for identifying unplaced passenger service units for a production aircraft is depicted in accordance with an illustrative embodiment. The process in FIG. 12 can be implemented in hardware, software, or both. When implemented in software, the process can take the form of program code that is run by one or more processor units located in one or more hardware devices in one or more computer systems. For example, the process can be implemented in at least one of layout manager 108 in computer system 106 in FIG. 1 or layout manager 402 in FIG. 4.

The process begins by identifying a set of passenger service units for a production aircraft remaining unplaced within the production aircraft because of a lack of room to place the set of passenger service units in lengths available after placing the passenger service units using a set of priority rules (operation 1200). The process generates a nonconformance report identifying a failed placement of the set of passenger service units (operation 1202). The process terminates thereafter.

Figure 13:
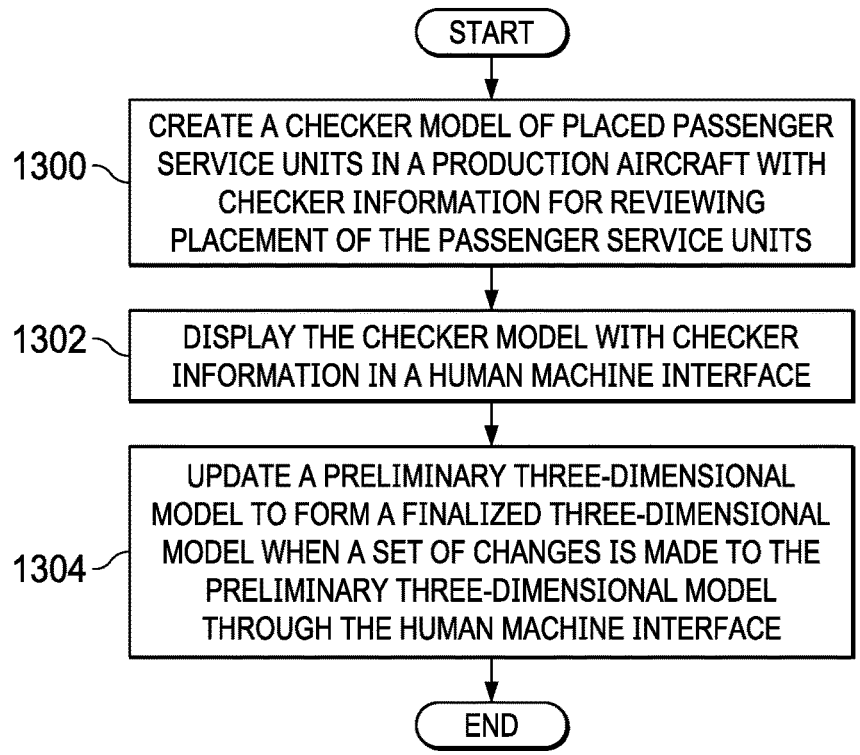
FIG. 13 is an illustration of a flowchart of a process for generating a finalized three-dimensional model of passenger service unit placements for a production aircraft in accordance with an illustrative embodiment.

Tuning now to FIG. 13, an illustration of a flowchart of a process for generating a finalized three-dimensional model of passenger service unit placements for a production aircraft is depicted in accordance with an illustrative embodiment. The process in FIG. 13 can be implemented in hardware, software, or both. When implemented in software, the process can take the form of program code that is run by one or more processor units located in one or more hardware devices in one or more computer systems. For example, the process can be implemented in at least one of layout manager 108 in computer system 106 in FIG. 1 or layout manager 402 in FIG. 4. This process can be performed on a preliminary three-dimensional model of the passenger service unit placement.

The process begins by creating a checker model of placed passenger service units in a production aircraft with checker information for reviewing placement of the passenger service units (operation 1300). The process displays the checker model with checker information in a human machine interface (operation 1302).

The process updates a preliminary three-dimensional model to form a finalized three-dimensional model when a set of changes is made to the preliminary three-dimensional model through the human machine interface (operation 1304). Using final three-dimensional passenger service unit layout 432 in FIG. 4, the process may further generate two-dimensional installation drawings that include, for the particular aircraft, an identification of the select passenger service unit components (from a plurality of different passenger service unit components) that are determined to be installed at each of a plurality of seat locations. The process may further generate, using final three-dimensional passenger service unit layout 432, installation instructions for use with the two-dimensional installation drawings, for installation of the determined components at each of the plurality of seat locations, to produce the determined passenger service unit layout on the particular aircraft. The process may further output the generated two-dimensional installation drawings and/or final to the work station for the particular aircraft, along with the bill of material and identified components, which are used in the subsequent step of producing the determined particular passenger service unit layout on the particular aircraft. The process terminates thereafter.

Figure 14:
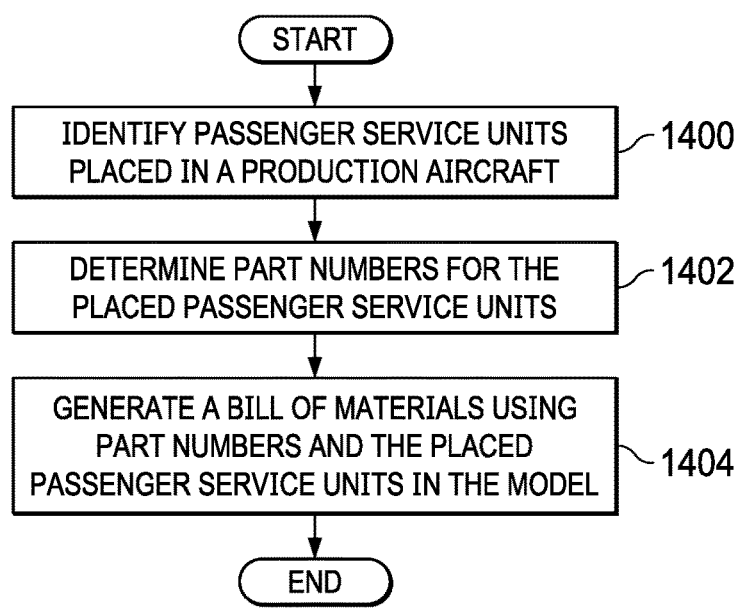
FIG. 14 is an illustration of a flowchart of a process for generating a bill of materials for a production aircraft in accordance with an illustrative embodiment.

In FIG. 14, an illustration of a flowchart of a process for generating a bill of materials for a production aircraft is depicted in accordance with an illustrative embodiment. The process in FIG. 14 can be implemented in hardware, software, or both. When implemented in software, the process can take the form of program code that is run by one or more processor units located in one or more hardware devices in one or more computer systems. For example, the process can be implemented in at least one of layout manager 108 in computer system 106 in FIG. 1 or layout manager 402 in FIG. 4.

The process begins by identifying passenger service units placed in a production aircraft (operation 1400). This determination can be made using a model of a three-dimensional passenger service unit layout with determined placements for the passenger service units.

The process determines part numbers for the placed passenger service units (operation 1402). The process generates a bill of materials using part numbers and the placed passenger service units in the model (operation 1404). The process terminates thereafter. The production aircraft can be manufactured using the bill of materials.

Figure 15:
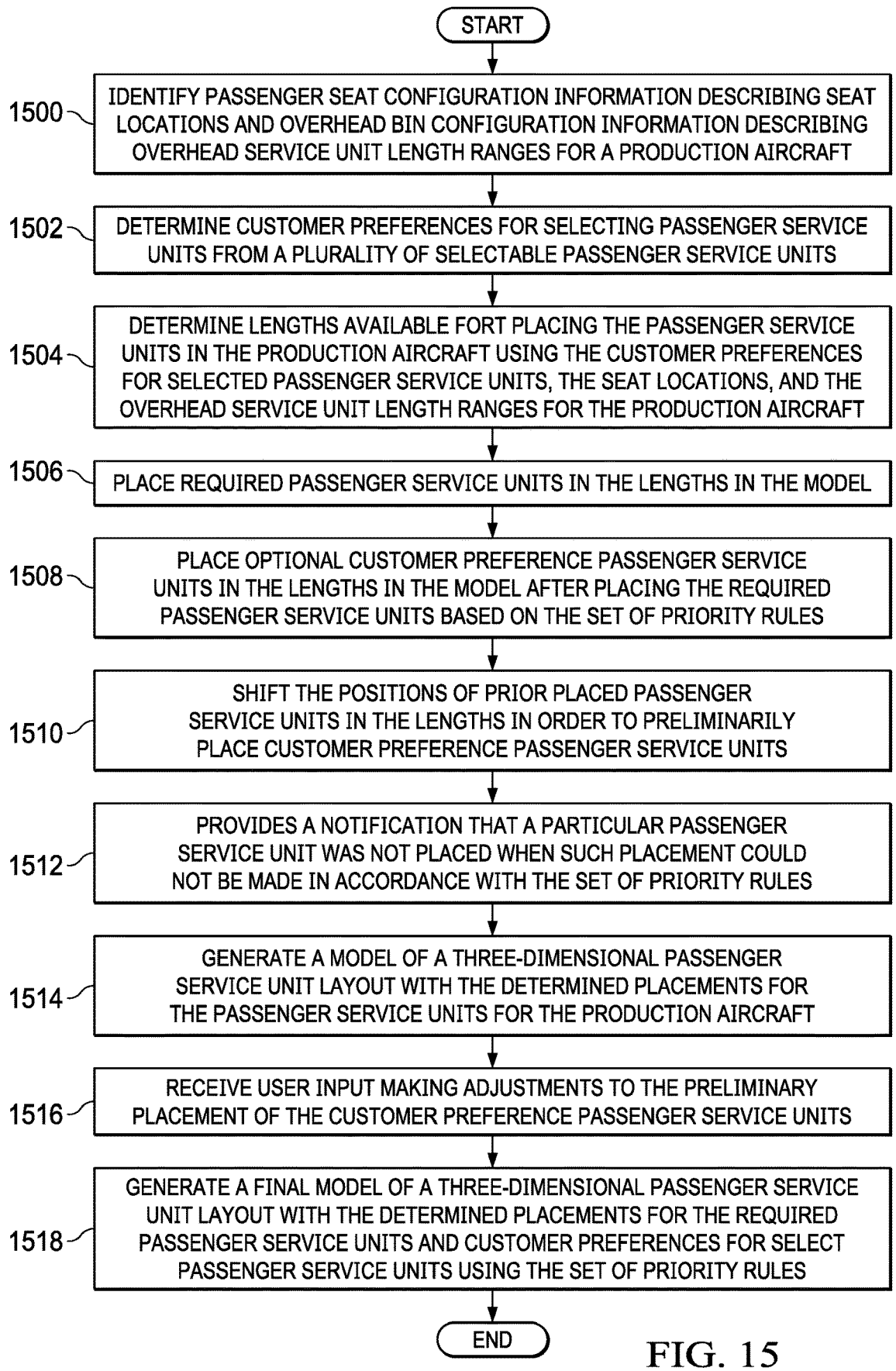
FIG. 15 is an illustration of a flowchart of a process for creating a passenger service unit layout for a production aircraft in accordance with an illustrative embodiment.

With reference next to FIG. 15, an illustration of a flowchart of a process for creating a passenger service unit layout for a production aircraft is depicted in accordance with an illustrative embodiment. The process in FIG. 15 can be implemented in hardware, software, or both. When implemented in software, the process can take the form of program code that is run by one or more processor units located in one or more hardware devices in one or more computer systems. For example, the process can be implemented in layout manager 108 in computer system 106 in FIG. 1.

The process begins by identifying passenger seat configuration information describing seat locations and overhead bin configuration information describing overhead service unit length ranges for a production aircraft (operation 1500). The process determines customer preferences for selecting passenger service units from a plurality of selectable passenger service units (operation 1502). The process determines lengths available for placing the passenger service units in the production aircraft using the customer preferences for selected passenger service units, the seat locations, and the overhead service unit length ranges for the production aircraft (operation 1504).

The process places required passenger service units in the lengths in the model (operation 1506). The process places optional customer preference passenger service units in the lengths in the model after placing the required passenger service units based on the set of priority rules (operation 1508). The process shifts the positions of prior placed passenger service units in the lengths in order to preliminarily place customer preference passenger service units (operation 1510).

The process provides a notification that a particular passenger service unit was not placed when such placement could not be made in accordance with the set of priority rules (operation 1512). The set of priority rules includes minimum spacing requirements between different passenger service units.

The set of priority rules specifies a priority in placing different types of the passenger service units. In this illustrative example, the set of priority rules is specific for the particular production aircraft for which the passenger service unit layout is being generated.

The process generates a model of a three-dimensional passenger service unit layout with the determined placements for the passenger service units for the production aircraft (operation 1514). The model in operation 1514 includes the preliminary placement of customer preference passenger service units.

The process receives user input making adjustments to the preliminary placement of the customer preference passenger service units (operation 1516). The user input can swap placed customer preference passenger service units with those that could not be placed. In other illustrative examples, the user input can change the order location of customer preference passenger service units. This user input can be generated by a designer or based on feedback from the customer.

The process generates a final model of a three-dimensional passenger service unit layout with the determined placements for the required passenger service units and customer preferences for select passenger service units using the set of priority rules (operation 1518). The process terminates thereafter. The final model of the passenger service unit layout is used for installation of the passenger service units on the production aircraft.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 16:
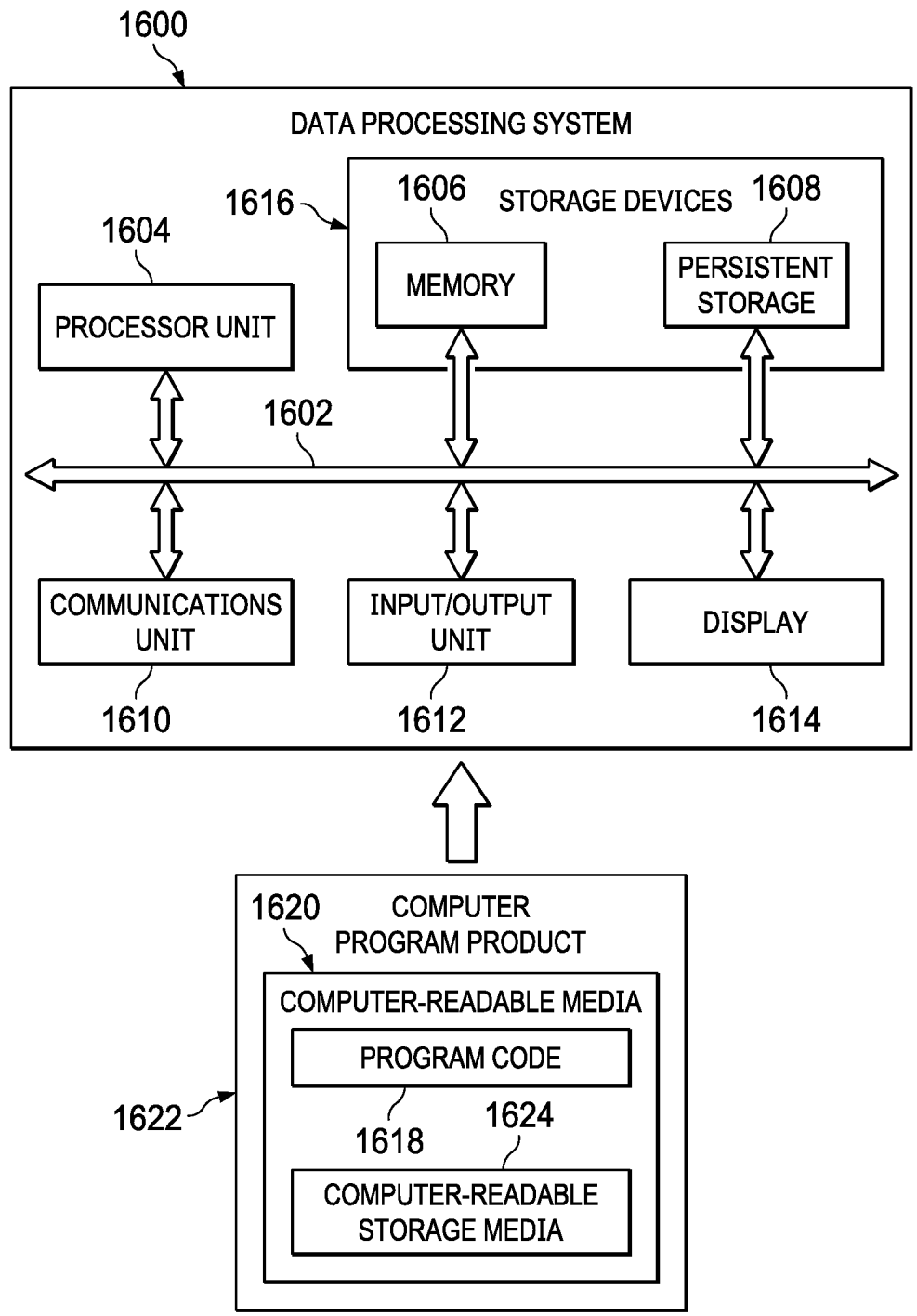
FIG. 16 is an illustration of a block diagram of a data processing system in accordance with an illustrative embodiment.

Turning now to FIG. 16, an illustration of a block diagram of a data processing system is depicted in accordance with an illustrative embodiment. Data processing system 1600 can be used to implement one or more devices in computer system 106 in FIG. 1.

In this illustrative example, data processing system 1600 includes communications framework 1602, which provides communications between processor unit 1604, memory 1606, persistent storage 1608, communications unit 1610, input/output (I/O) unit 1612, and display 1614. In this example, communications framework 1602 takes the form of a bus system.

Processor unit 1604 serves to execute instructions for software that can be loaded into memory 1606. Processor unit 1604 includes one or more processors. For example, processor unit 1604 can be selected from at least one of a multicore processor, a central processing unit (CPU), a graphics processing unit (GPU), a physics processing unit (PPU), a digital signal processor (DSP), a network processor, or some other suitable type of processor.

Memory 1606 and persistent storage 1608 are examples of storage devices 1616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1616 may also be referred to as computer-readable storage devices in these illustrative examples. Memory 1606, in these examples, can be, for example, a random-access memory or any other suitable volatile or non-volatile storage device. Persistent storage 1608 can take various forms, depending on the particular implementation.

For example, persistent storage 1608 may contain one or more components or devices. For example, persistent storage 1608 can be a hard drive, a solid-state drive (SSD), a flash memory, a rewritable optical disk, a rewritable magnetic tape, or some combination of the above. The media used by persistent storage 1608 also can be removable. For example, a removable hard drive can be used for persistent storage 1608.

Communications unit 1610, in these illustrative examples, provides for communications with other data processing systems or devices. In these illustrative examples, communications unit 1610 is a network interface card.

Input/output unit 1612 allows for input and output of data with other devices that can be connected to data processing system 1600. For example, input/output unit 1612 can provide a connection for user input through at least one of a keyboard, a mouse, or some other suitable input device. Further, input/output unit 1612 can send output to a printer. Display 1614 provides a mechanism to display information to a user.

Instructions for at least one of the operating system, applications, or programs can be located in storage devices 1616, which are in communication with processor unit 1604 through communications framework 1602. The processes of the different embodiments can be performed by processor unit 1604 using computer-implemented instructions, which can be located in a memory, such as memory 1606.

These instructions are referred to as program code, computer usable program code, or computer-readable program code that can be read and executed by a processor in processor unit 1604. The program code in the different embodiments can be embodied on different physical or computer-readable storage medium, such as memory 1606 or persistent storage 1608.

Program code 1618 is located in a functional form on computer-readable medium 1620 that is selectively removable and can be loaded onto or transferred to data processing system 1600 for execution by processor unit 1604. Program code 1618 and computer-readable medium 1620 form computer program product 1622 in these illustrative examples. In the illustrative example, computer-readable medium 1620 is computer-readable storage medium 1624.

In these illustrative examples, computer-readable storage medium 1624 is a physical or tangible storage device used to store program code 1618 rather than a medium that propagates or transmits program code 1618. Computer readable storage medium 1624, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1618 can be transferred to data processing system 1600 using a computer-readable signal media. The computer-readable signal media can be, for example, a propagated data signal containing program code 1618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1600 are not meant to provide architectural limitations to the manner in which different embodiments can be implemented. In some illustrative examples, one or more of the components may be incorporated in or otherwise form a portion of, another component. For example, memory 1606, or portions thereof, can be incorporated in processor unit 1604 in some illustrative examples. The different illustrative embodiments can be implemented in a data processing system including components in addition to or in place of those illustrated for data processing system 1600. Other components shown in FIG. 16 can be varied from the illustrative examples shown. The different embodiments can be implemented using any hardware device or system capable of running program code 1618.

Figure 17:
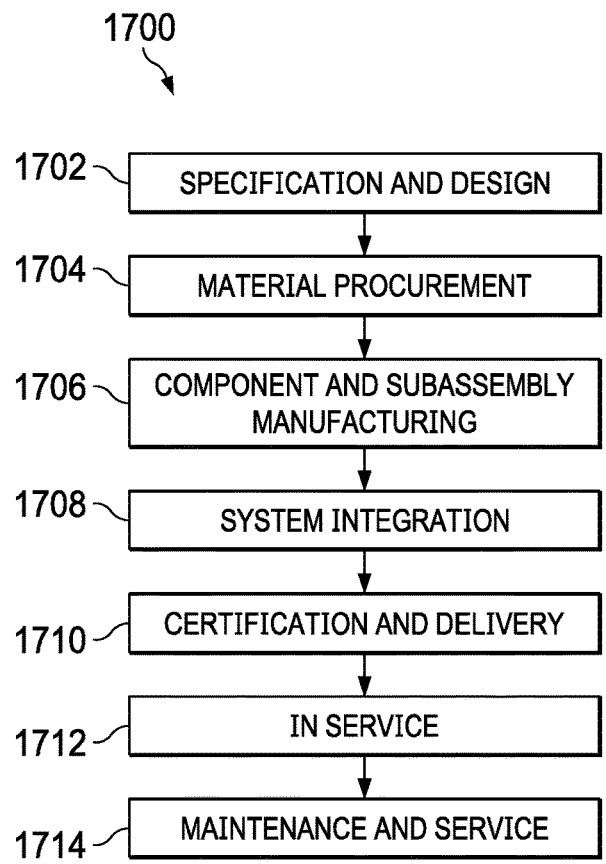
FIG. 17 is an illustration of an aircraft manufacturing and service method in accordance with an illustrative embodiment.
Figure 18:
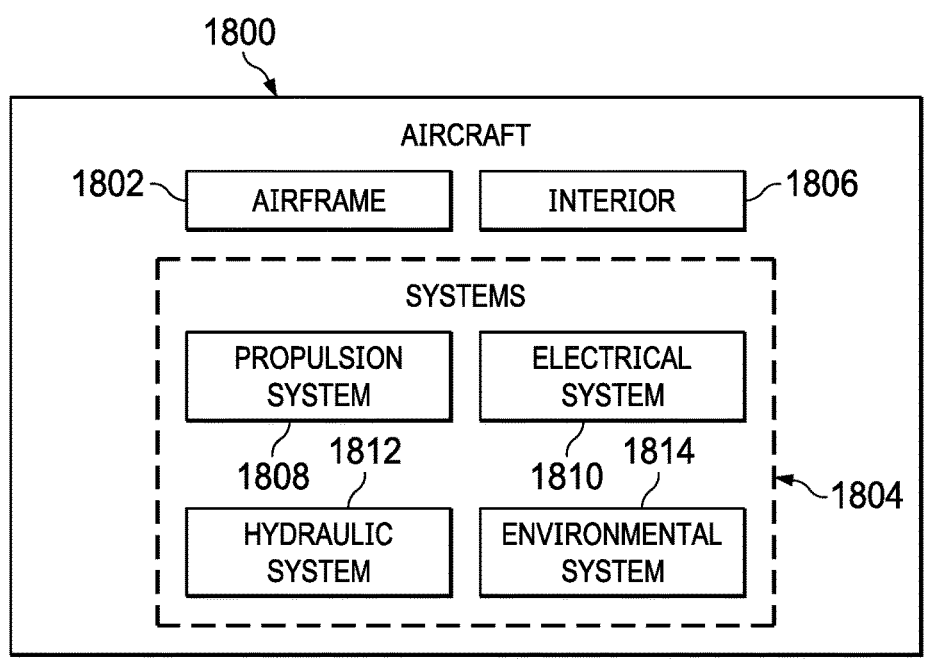
FIG. 18 is an illustration of a block diagram of an aircraft in which an illustrative embodiment may be implemented.

Illustrative embodiments of the disclosure may be described in the context of aircraft manufacturing and service method 1700 as shown in FIG. 17 and aircraft 1800 as shown in FIG. 18. Turning first to FIG. 17, an illustration of an aircraft manufacturing and service method is depicted in accordance with an illustrative embodiment. During pre-production, aircraft manufacturing and service method 1700 may include specification and design 1702 of aircraft 1800 in FIG. 18 and material procurement 1704.

During production, component and subassembly manufacturing 1706 and system integration 1708 of aircraft 1800 in FIG. 18 takes place. Thereafter, aircraft 1800 in FIG. 18 can go through certification and delivery 1710 in order to be placed in service 1712. While in service 1712 by a customer, aircraft 1800 in FIG. 18 is scheduled for routine maintenance and service 1714, which may include modification, reconfiguration, refurbishment, and other maintenance or service.

Each of the processes of aircraft manufacturing and service method 1700 may be performed or carried out by a system integrator, a third party, an operator, or some combination thereof. In these examples, the operator may be a customer. For the purpose of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of an aircraft is depicted in which an illustrative embodiment may be implemented. In this example, aircraft 1800 is produced by aircraft manufacturing and service method 1700 in FIG. 17 and may include airframe 1802 with plurality of systems 1804 and interior 1806. Examples of systems 1804 include one or more of propulsion system 1808, electrical system 1810, hydraulic system 1812, and environmental system 1814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1700 in FIG. 17. For example, layout manager 108 in computer system 106 in FIG. 1 can be used to generate a passenger service unit layout for aircraft 1800. The generation of the passenger service unit layout of passenger service units can be performed during specification and design 1702 of aircraft 1800.

As another example, the generation of the passenger service unit layout can also be performed during other stages such as maintenance and service 1714. A passenger service layout can be created or modified during routine maintenance and service 1714, which may include modification, reconfiguration, or refurbishment of aircraft 1800 as well as other maintenance or service.

In one illustrative example, components or subassemblies produced in component and subassembly manufacturing 1706 in FIG. 17 can be fabricated or manufactured in a manner similar to components or subassemblies produced while aircraft 1800 is in service 1712 in FIG. 17. As yet another example, one or more apparatus embodiments, method embodiments, or a combination thereof can be utilized during production stages, such as component and subassembly manufacturing 1706 and system integration 1708 in FIG. 17. One or more apparatus embodiments, method embodiments, or a combination thereof may be utilized while aircraft 1800 is in service 1712, during maintenance and service 1714 in FIG. 17, or both. The use of a number of the different illustrative embodiments may substantially expedite the assembly of aircraft 1800, reduce the cost of aircraft 1800, or both expedite the assembly of aircraft 1800 and reduce the cost of aircraft 1800.

Figure 19:
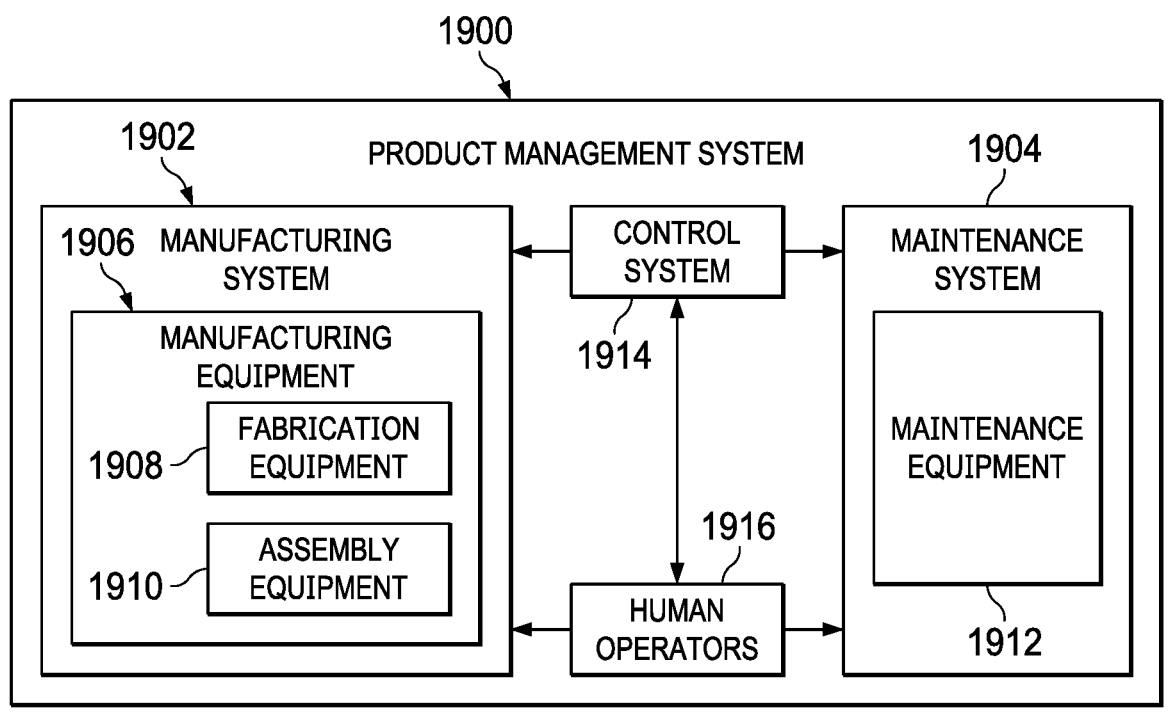
FIG. 19 is an illustration of a block diagram of a product management system in accordance with an illustrative embodiment.

Turning now to FIG. 19, an illustration of a block diagram of a product management system is depicted in accordance with an illustrative embodiment. Product management system 1900 is a physical hardware system. In this illustrative example, product management system 1900 includes at least one of manufacturing system 1902 or maintenance system 1904.

Manufacturing system 1902 is configured to manufacture products, such as aircraft 1800 in FIG. 18. As depicted, manufacturing system 1902 includes manufacturing equipment 1906. Manufacturing equipment 1906 includes at least one of fabrication equipment 1908 or assembly equipment 1910.

Fabrication equipment 1908 is equipment that is used to fabricate components for parts used to form aircraft 1800 in FIG. 18. For example, fabrication equipment 1908 can include machines and tools. These machines and tools can be at least one of a drill, a hydraulic press, a furnace, a mold, a composite tape laying machine, a vacuum system, a lathe, or other suitable types of equipment. Fabrication equipment 1908 can be used to fabricate at least one of metal parts, composite parts, semiconductors, circuits, fasteners, ribs, skin panels, spars, antennas, or other suitable types of parts.

Assembly equipment 1910 is equipment used to assemble parts to form aircraft 1800 in FIG. 18. In particular, assembly equipment 1910 is used to assemble components and parts to form aircraft 1800 in FIG. 18. Assembly equipment 1910 also can include machines and tools. These machines and tools may be at least one of a robotic arm, a crawler, a fastener installation system, a rail-based drilling system, or a robot. Assembly equipment 1910 can be used to assemble parts such as seats, horizontal stabilizers, wings, engines, engine housings, landing gear systems, and other parts for aircraft 1800 in FIG. 18.

In this illustrative example, maintenance system 1904 includes maintenance equipment 1912. Maintenance equipment 1912 can include any equipment needed to perform maintenance on aircraft 1800 in FIG. 18. Maintenance equipment 1912 may include tools for performing different operations on parts on aircraft 1800 in FIG. 18. These operations can include at least one of disassembling parts, refurbishing parts, inspecting parts, reworking parts, manufacturing replacement parts, or other operations for performing maintenance on aircraft 1800 in FIG. 18. These operations can be for routine maintenance, inspections, upgrades, refurbishment, or other types of maintenance operations.

In the illustrative example, maintenance equipment 1912 may include ultrasonic inspection devices, x-ray imaging systems, vision systems, drills, crawlers, and other suitable devices. In some cases, maintenance equipment 1912 can include fabrication equipment 1908, assembly equipment 1910, or both to produce and assemble parts that needed for maintenance.

Product management system 1900 also includes control system 1914. Control system 1914 is a hardware system and may also include software or other types of components. Control system 1914 is configured to control the operation of at least one of manufacturing system 1902 or maintenance system 1904. In particular, control system 1914 can control the operation of at least one of fabrication equipment 1908, assembly equipment 1910, or maintenance equipment 1912.

The hardware in control system 1914 can be implemented using hardware that may include computers, circuits, networks, and other types of equipment. The control may take the form of direct control of manufacturing equipment 1906. For example, robots, computer-controlled machines, and other equipment can be controlled by control system 1914. In other illustrative examples, control system 1914 can manage operations performed by human operators 1916 in manufacturing or performing maintenance on aircraft 1800. For example, control system 1914 can assign tasks, provide instructions, display models, or perform other operations to manage operations performed by human operators 1916.

In these illustrative examples, passenger service unit layout system 102 in FIG. 1 can be implemented in control system 1914 for use in managing at least one of the manufacturing or maintenance of aircraft 1800 in FIG. 18. For example, passenger service unit layout system 102 and operate to models of three-dimensional passenger service unit layouts. These models can be used to perform manufacturing or maintenance such as modification, reconfiguration, or refurbishment of aircraft 1800. For example, the models can be used to generate work orders to install, remove, or relocate passenger service units. The models can also be used to generate a bill of materials. The bill of materials can be used to generate at least one of work orders or orders for passenger service units and other parts.

In the different illustrative examples, human operators 1916 can operate or interact with at least one of manufacturing equipment 1906, maintenance equipment 1912, or control system 1914. This interaction can occur to manufacture aircraft 1800 in FIG. 18.

Of course, product management system 1900 may be configured to manage other products other than aircraft 1800 in FIG. 18. Although product management system 1900 has been described with respect to manufacturing in the aerospace industry, product management system 1900 can be configured to manage products for other industries. For example, product management system 1900 can be configured to manufacture products for the automotive industry as well as any other suitable industries.

Thus, the illustrative embodiments provide a method, apparatus, and system for creating a passenger service unit layout for a production aircraft. The process identifies passenger seat configuration information describing seat locations and overhead bin configuration information describing overhead service unit length ranges for the production aircraft. The process determines lengths available for placing passenger service units in the production aircraft using the passenger seat configuration information and overhead bin configuration information for the production aircraft. The process places the passenger service units in the lengths in a model using the set of priority rules for the passenger service units to determine placements of the passenger service units. The set of priority rules specifies a priority in placing different types of the passenger service units. The model is digital data comprising data points in space and information about the placed passenger service units. The process generates a model of a three-dimensional passenger service unit layout with the determined placements for the passenger service units for the production aircraft.

The processes can be implemented as a practical application of operations that are performed to place passenger service units in a model of a three-dimensional passenger service unit layout that cannot efficiently be performed by current techniques. The illustrative examples involve a practical application of operations that obtain information about the configuration of components needed to generate the model of the three-dimensional passenger service unit layout in a manner that can provide a graphical tool that enables a human operator to select a production aircraft and to generate the model of the three-dimensional passenger service unit layout for that particular production aircraft. The model can then be used to generate at least one of a bill of materials, a work order, or other instructions that can be used to control the manufacturing or maintenance of the production aircraft.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A passenger service unit layout system for a production aircraft comprising:
   a computer system; and
   a layout manager configured to:
   identify passenger seat configuration information describing seat locations and overhead bin configuration information describing overhead service unit length ranges for the production aircraft;
   determine lengths available for placing passenger service units in the production aircraft using the passenger seat configuration information and the overhead bin configuration information for the production aircraft;

place the passenger service units in the lengths using a set of priority rules for the passenger service units to determine placements of the passenger service units, wherein the set of priority rules specify a priority in placing different types of the passenger service units; and generate a model of a three-dimensional passenger service unit layout with determined placements for the passenger service units for the production aircraft based on the set of priority rules, wherein the model of the three-dimensional passenger service unit layout is used for installation of the passenger service units on the production aircraft.

2. The passenger service unit layout system of claim 1, wherein the layout manager is configured to:

determine customer preferences for selecting the passenger service units from a plurality of selectable passenger service units; and wherein in determining the lengths available for placing the passenger service units in the production aircraft using the passenger seat configuration information and the overhead bin configuration information for the production aircraft, the layout manager is configured to:

determine the lengths available for placement of the passenger service units using the customer preferences for selected passenger service units, the seat locations, and the overhead service unit length ranges for the production aircraft.

3. The passenger service unit layout system of claim 2, wherein in placing the passenger service units in the lengths using the set of priority rules for the passenger service units to determine placements of the passenger service units, the layout manager is configured to:

place required passenger service units in the model;

place optional customer preference passenger service units in the model after placing the required passenger service units based on the set of priority rules;

shift positions of prior placed passenger service units in order to preliminarily place the optional customer preference passenger service units; and provide a notification that a particular passenger service unit was not placed when such placement could not be made in accordance with the set of priority rules, wherein such set of priority rules includes minimum spacing requirements between different passenger service units.

4. The passenger service unit layout system of claim 3, wherein the layout manager is configured to:

generate a final model of the three-dimensional passenger service unit layout with determined placements for the required passenger service units and the customer preferences for select passenger service units using the set of priority rules.

5. The passenger service unit layout system of claim 1, wherein the layout manager is configured to:

identify a set of passenger service units for the production aircraft remaining unplaced within the production aircraft because of a lack of room to place the set of passenger service units in the lengths available after placing the passenger service units using the set of priority rules; and generate a nonconformance report identifying a failed placement of the set of passenger service units.

6. The passenger service unit layout system of claim 1, wherein the layout manager is configured to:

determine part numbers for placed passenger service units.

7. The passenger service unit layout system of claim 6, wherein the layout manager is configured to:

generate a bill of materials using part numbers and the placed passenger service units in the model, wherein the production aircraft is manufactured using the bill of materials.

8. The passenger service unit layout system of claim 1, wherein gaps are present between passenger service units and wherein the layout manager is configured to:

place spacer panels in the gaps between the passenger service units in the model.

9. The passenger service unit layout system of claim 1, wherein the model is a preliminary three-dimensional model and wherein the layout manager is configured to:

create a checker model of placed passenger service units in the production aircraft with checker information for reviewing the placements of the passenger service units;

display the checker model with checker information in human machine interface; and update the preliminary three-dimensional model to form a finalized three-dimensional model when a set of changes is made to the preliminary three-dimensional model through the human machine interface.

10. The passenger service unit layout system of claim 1, wherein each length in the lengths corresponds to a row of passenger seats and wherein in placing the passenger service units in the lengths in the model, the layout manager is configured to:

identify the set of priority rules that define the set of priorities for placing passenger service units are based on at least one of Federal Aviation Agency rules, manufacturer rules, or customer preferences, wherein the set of priority rules is specific for the production aircraft; and place the passenger service units for the row of passenger seats using the length corresponding to the row of passenger seats, a cushion reference point for the row of passenger seats, and the set of priority rules specifically identified to the production aircraft.

11. The passenger service unit layout system of claim 1, wherein in identifying passenger seat configuration information describing seat locations and overhead bin configuration information describing overhead service unit length ranges for the production aircraft, the layout manager is configured to:

extract the passenger seat configuration information and the overhead bin configuration information for the production aircraft from a three-dimensional model of the production aircraft.

12. The passenger service unit layout system of claim 1, wherein in identifying passenger seat configuration information describing seat locations and overhead bin configuration information describing overhead service unit length ranges for the production aircraft, the layout manager is configured to:

receive customer passenger service unit options in a user input generated by a human machine interface.

13. The passenger service unit layout system of claim 1, wherein the layout manager is configured to:

determine the set of priority rules from at least one of government regulations, manufacturer specifications, or customer preferences.

14. The passenger service unit layout system of claim 1, wherein the model is one of a three-dimensional model and a computer-aided design model.

15. The passenger service unit layout system of claim 1, wherein the passenger seat configuration information is located in at least one of a layout of passenger accommodations, a three-dimensional model of the production aircraft, or a computer-aided design model of the production aircraft.

16. A passenger service unit layout system comprising:
a computer system; and
a layout manager in the computer system, wherein the layout manager is configured to:
identify a set of priority rules that are specific for a production aircraft, wherein the set of priority rules specify a priority in placing different types of passenger service units and are based on government regulations, manufacturer specifications, and customer preferences for passenger service units in the production aircraft;
identify passenger seat configuration information and overhead bin configuration information for the production aircraft, wherein the passenger seat configuration information describes seat locations for passenger seats in the production aircraft and the overhead bin configuration information describes overhead service unit length ranges in the production aircraft;
determine lengths available for placing the passenger service units in the production aircraft using the passenger seat configuration information and the overhead bin configuration information for the production aircraft;
place the passenger service units in the lengths in a model using the set of priority rules for the passenger service units, wherein the model is digital data comprising data points in a space and information about the passenger service units placed in the lengths as determined based on the set of priority rules, wherein the model is used for installation of the passenger service units on the production aircraft;
identify part numbers for the passenger service units; and
generate a bill of materials using the part numbers identified and passenger service units in the model, wherein the bill of materials is used to manufacture the production aircraft.

17. A method for creating a passenger service unit layout for a production aircraft, the method comprising:
identifying, by a computer system, passenger seat configuration information describing seat locations and overhead bin configuration information describing overhead service unit length ranges for the production aircraft;
determining, by the computer system, lengths available for placing passenger service units in the production aircraft using the passenger seat configuration information and the overhead bin configuration information for the production aircraft;
placing, by the computer system, the passenger service units in the lengths using a set of priority rules for the passenger service units to determine placements of the passenger service units, wherein the set of priority rules specify a priority in placing different types of the passenger service units; and
generating, by the computer system, a model of a three-dimensional passenger service unit layout with determined placements for the passenger service units for the production aircraft, wherein the model of the three-dimensional passenger service unit layout is used for installation of the passenger service units on the production aircraft.

18. The method of claim 17, further comprising:
determining customer preferences for selecting the passenger service units from a plurality of selectable passenger service units; and
wherein in determining the lengths available for placing the passenger service units in the production aircraft using the passenger seat configuration information and the overhead bin configuration information for the production aircraft comprises:
determining the lengths available for placement of the passenger service units using the customer preferences for selected passenger service units, the seat locations, and the overhead service unit length ranges for the production aircraft.

19. The method of claim 18, wherein placing the passenger service units in the lengths using the set of priority rules for the passenger service units to determine placements of the passenger service units comprises:
placing required passenger service units in the lengths in the model;
placing optional customer preference passenger service units in the lengths in the model after placing the required passenger service units based on the set of priority rules;
shifting positions of prior placed passenger service units in the lengths in order to preliminarily place optional customer preference passenger service units; and
providing a notification that a particular passenger service unit was not placed when such placement could not be made in accordance with the set of priority rules, where such set of priority rules includes minimum spacing requirements between different passenger service units.

20. The method of claim 19 further comprising:
generating a final model of the three-dimensional passenger service unit layout with determined placements for the required passenger service units and the customer preferences for select passenger service units using the set of priority rules.

21. The method of claim 17 further comprising:
identifying a set of passenger service units for the production aircraft remaining unplaced within the production aircraft because of a lack of room to place the set of passenger service units in the lengths available after placing the passenger service units using the set of priority rules; and
generating a nonconformance report identifying a failed placement of the set of passenger service units.

22. The method of claim 17 further comprising:
determining part numbers for the placed passenger service units.

23. The method of claim 22 further comprising:
generating a bill of materials using the part numbers and the placed passenger service units in the model, wherein the production aircraft is manufactured using the bill of materials.

24. The method of claim 17, wherein gaps are present between the passenger service units and further comprising:
placing spacer panels in the gaps between passenger service units in the model.

25. The method of claim 17, wherein the model is a preliminary three-dimensional model and further comprising:
creating a checker model of the placed passenger service units in the production aircraft with checker information for reviewing the placements of the passenger service units;
displaying the checker model with checker information in human machine interface; and
updating the preliminary three-dimensional model to form a finalized three-dimensional model when a set of changes is made to the preliminary three-dimensional model through the human machine interface.

26. The method of claim 25, wherein each length in the lengths corresponds to a row of passenger seats and wherein placing, by the computer system, the passenger service units in the lengths in the model using the set of priority rules to determine placements of the passenger service units for the passenger service units comprises:
identifying the set of priority rules that define the set of priorities for placing the passenger service units are based on at least one of Federal Aviation Agency rules, manufacturer rules, or customer preferences, wherein the set of priority rules is specific for the production aircraft; and
placing the passenger service units for the row of passenger seats using the length corresponding to the row of passenger seats, a cushion reference point for the row of passenger seats, and the set of priority rules specifically identified to the production aircraft.

27. The method of claim 17, wherein identifying, by the computer system, the passenger seat configuration information describing the seat locations and the overhead bin configuration information describing the overhead service unit length ranges for the production aircraft comprises:
extracting the passenger seat configuration information and the overhead bin configuration information for the production aircraft from a three-dimensional model of the production aircraft.

28. The method of claim 17, wherein identifying, by the computer system, the passenger seat configuration information describing the seat locations and the overhead bin configuration information describing the overhead service unit length ranges for the production aircraft comprises:
receiving customer passenger service unit options in a user input generated by a human machine interface.

29. The method of claim 17 further comprising:
determining the set of priority rules from at least one of government regulations, manufacturer rules, or customer preferences.

30. The method of claim 17, wherein the model is one of a three-dimensional model and a computer-aided design model.

31. The method of claim 17, wherein the passenger seat configuration information is located in at least one of a layout of passenger accommodations, a three-dimensional model of the production aircraft, or a computer-aided design model of the production aircraft.

* * * * *